US010648790B2

(12) United States Patent
Foster et al.

(10) Patent No.: US 10,648,790 B2
(45) Date of Patent: May 12, 2020

(54) SYSTEM FOR DETERMINING A THREE-DIMENSIONAL POSITION OF A TESTING TOOL

(71) Applicant: TruInject Medical Corp., Irvine, CA (US)

(72) Inventors: Clark B. Foster, Mission Viejo, CA (US); Scott Cameron Royston, Austin, TX (US)

(73) Assignee: Truinject Corp., Irvine, CA (US)

( * ) Notice: Subject to any disclaimer, the term of this patent is extended or adjusted under 35 U.S.C. 154(b) by 403 days.

(21) Appl. No.: 15/446,405

(22) Filed: Mar. 1, 2017

(65) Prior Publication Data
US 2017/0254636 A1    Sep. 7, 2017

Related U.S. Application Data

(60) Provisional application No. 62/302,328, filed on Mar. 2, 2016.

(51) Int. Cl.
*G01B 11/00* (2006.01)
*G06T 7/80* (2017.01)
(Continued)

(52) U.S. Cl.
CPC ............... *G01B 11/002* (2013.01); *G06T 7/73* (2017.01); *G06T 7/80* (2017.01); *G09B 9/00* (2013.01);
(Continued)

(58) Field of Classification Search
None
See application file for complete search history.

(56) References Cited

U.S. PATENT DOCUMENTS

| 3,941,121 A | 3/1976 | Olinger et al. |
| 4,142,517 A | 3/1979 | Contreras Guerrero de Stavropoulos et al. |

(Continued)

FOREIGN PATENT DOCUMENTS

| AU | 2011218649 B2 | 9/2011 |
| AU | 2015255197 A1 | 12/2015 |

(Continued)

OTHER PUBLICATIONS

Afzal, et al., "Use of Earth's Magnetic Field for Mitigating Gyroscope Errors Regardless of Magnetic Perturbation," Sensors 2011, 11, 11390-11414; doi:10.3390/s111211390, 25 pp. published Nov. 30, 2011.

(Continued)

*Primary Examiner* — Paul A D'Agostino
(74) *Attorney, Agent, or Firm* — Knobbe, Martens, Olson & Bear, LLP

(57) ABSTRACT

A system for determining a three-dimensional position of a tip of a testing tool in an anatomic training model can be used for injection training. The system can include first and second cameras positioned in the anatomic training model. The first and second cameras can each detect an area of light emitted from the tip of the testing tool. The system can also include a processing unit configured to trace the emitted light away from a location of a centroid of the area of emitted light in the first camera and a location of a centroid of the area of emitted light in the second camera respectively, and calculate a three-dimensional position of the distal tip of the testing tool based on the locations of the centroids. The calculation can take into account refraction of the emitted light through an innermost layer of the training model.

16 Claims, 10 Drawing Sheets

(51) Int. Cl.
  *G06T 7/73* (2017.01)
  *G09B 9/00* (2006.01)
  *G09B 23/28* (2006.01)
  *G09B 23/30* (2006.01)
  *H04N 5/247* (2006.01)

(52) U.S. Cl.
  CPC ............ *G09B 23/285* (2013.01); *G09B 23/30* (2013.01); *H04N 5/247* (2013.01); *G06T 2210/41* (2013.01)

(56) References Cited

U.S. PATENT DOCUMENTS

| | | | |
|---|---|---|---|
| 4,311,138 A | 1/1982 | Sugarman | |
| 4,356,828 A | 11/1982 | Jamshidi | |
| 4,410,020 A | 10/1983 | Lorenz | |
| 4,515,168 A | 5/1985 | Chester et al. | |
| 4,566,438 A | 1/1986 | Liese et al. | |
| 4,836,632 A | 6/1989 | Bardoorian | |
| 5,065,236 A * | 11/1991 | Diner | G02B 27/22 348/54 |
| 5,241,184 A | 8/1993 | Menzel | |
| 5,518,407 A | 5/1996 | Greenfield et al. | |
| 5,534,704 A * | 7/1996 | Robinson | G06E 3/005 250/550 |
| 5,622,170 A | 4/1997 | Shulz | |
| 5,651,783 A | 7/1997 | Reynard | |
| 5,899,692 A | 5/1999 | Davis et al. | |
| 6,064,749 A | 5/2000 | Hirota et al. | |
| 6,353,226 B1 | 3/2002 | Khalil et al. | |
| 6,485,308 B1 | 11/2002 | Goldstein | |
| 6,564,087 B1 | 5/2003 | Pitris et al. | |
| 6,575,757 B1 | 6/2003 | Leight et al. | |
| 6,702,790 B1 | 3/2004 | Ross et al. | |
| 6,769,286 B2 | 8/2004 | Biermann et al. | |
| 7,383,728 B2 | 6/2008 | Noble et al. | |
| 7,500,853 B2 | 3/2009 | Bevirt et al. | |
| 7,553,159 B1 | 6/2009 | Arnal et al. | |
| 7,594,815 B2 | 9/2009 | Toly | |
| 7,665,995 B2 | 2/2010 | Toly | |
| 7,725,279 B2 | 5/2010 | Luinge et al. | |
| 7,761,139 B2 | 7/2010 | Tearney et al. | |
| 7,857,626 B2 | 12/2010 | Toly | |
| 8,007,281 B2 | 8/2011 | Toly | |
| 8,072,606 B2 | 12/2011 | Chau et al. | |
| 8,165,844 B2 | 4/2012 | Luinge et al. | |
| 8,203,487 B2 | 6/2012 | Hol et al. | |
| 8,208,716 B2 | 6/2012 | Choi et al. | |
| 8,250,921 B2 | 8/2012 | Nasiri et al. | |
| 8,257,250 B2 | 9/2012 | Tenger et al. | |
| 8,277,411 B2 | 10/2012 | Gellman | |
| 8,319,182 B1 | 11/2012 | Brady et al. | |
| 8,342,853 B2 | 1/2013 | Cohen | |
| 8,351,773 B2 | 1/2013 | Nasiri et al. | |
| 8,382,485 B2 | 2/2013 | Bardsley | |
| 8,450,997 B2 | 5/2013 | Silverman | |
| 8,467,855 B2 | 6/2013 | Yasui | |
| 8,525,990 B2 | 9/2013 | Wilcken | |
| 8,535,062 B2 | 9/2013 | Nguyen | |
| 8,632,498 B2 | 1/2014 | Rimsa et al. | |
| 8,655,622 B2 | 2/2014 | Yen et al. | |
| 8,764,449 B2 | 7/2014 | Rios et al. | |
| 8,818,751 B2 | 8/2014 | Van Acht et al. | |
| 8,961,189 B2 | 2/2015 | Rios et al. | |
| 9,017,080 B1 | 4/2015 | Placik | |
| 9,251,721 B2 | 2/2016 | Lampotang et al. | |
| 9,443,446 B2 | 9/2016 | Rios et al. | |
| 10,269,266 B2 | 4/2019 | Rios et al. | |
| 10,290,231 B2 | 5/2019 | Rios et al. | |
| 10,290,232 B2 | 5/2019 | Rios et al. | |
| 10,500,340 B2 | 12/2019 | Rios et al. | |
| 2002/0168618 A1 | 11/2002 | Anderson et al. | |
| 2002/0191000 A1 * | 12/2002 | Henn | G09B 23/28 345/619 |
| 2003/0031993 A1 | 2/2003 | Pugh | |
| 2003/0055380 A1 | 3/2003 | Flaherty | |
| 2003/0108853 A1 | 6/2003 | Chosack et al. | |
| 2003/0114842 A1 | 6/2003 | DiStefano | |
| 2003/0220557 A1 | 11/2003 | Cleary et al. | |
| 2004/0009459 A1 | 1/2004 | Anderson et al. | |
| 2004/0092878 A1 | 5/2004 | Flaherty | |
| 2004/0118225 A1 | 6/2004 | Wright et al. | |
| 2004/0126746 A1 | 7/2004 | Toly | |
| 2004/0175684 A1 | 9/2004 | Kaasa et al. | |
| 2005/0055241 A1 | 3/2005 | Horstmann | |
| 2005/0057243 A1 | 3/2005 | Johnson et al. | |
| 2005/0084833 A1 | 4/2005 | Lacey et al. | |
| 2005/0181342 A1 | 8/2005 | Toly | |
| 2006/0084050 A1 | 4/2006 | Haluck | |
| 2006/0194180 A1 | 8/2006 | Bevirt et al. | |
| 2006/0264745 A1 | 11/2006 | Da Silva | |
| 2007/0003917 A1 | 1/2007 | Kitching et al. | |
| 2007/0179448 A1 | 8/2007 | Lim et al. | |
| 2007/0197954 A1 | 8/2007 | Keenan | |
| 2007/0238981 A1 | 10/2007 | Zhu | |
| 2008/0097378 A1 | 4/2008 | Zuckerman | |
| 2008/0107305 A1 | 5/2008 | Vanderkooy et al. | |
| 2008/0123910 A1 * | 5/2008 | Zhu | A61B 90/36 382/128 |
| 2008/0138781 A1 | 6/2008 | Pellegrin et al. | |
| 2008/0176198 A1 | 7/2008 | Ansari et al. | |
| 2009/0036902 A1 * | 2/2009 | DiMaio | A61B 34/10 606/130 |
| 2009/0043253 A1 | 2/2009 | Podaima | |
| 2009/0046140 A1 | 2/2009 | Lashmet | |
| 2009/0061404 A1 | 3/2009 | Toly | |
| 2009/0074262 A1 | 3/2009 | Kudavelly | |
| 2009/0081619 A1 | 3/2009 | Miasnik | |
| 2009/0081627 A1 | 3/2009 | Ambrozio | |
| 2009/0123896 A1 | 5/2009 | Hu et al. | |
| 2009/0142741 A1 | 6/2009 | Ault et al. | |
| 2009/0161827 A1 * | 6/2009 | Gertner | A61F 9/008 378/65 |
| 2009/0208915 A1 | 8/2009 | Pugh | |
| 2009/0263775 A1 | 10/2009 | Ullrich | |
| 2009/0265671 A1 | 10/2009 | Sachs et al. | |
| 2009/0275810 A1 | 11/2009 | Ayers et al. | |
| 2009/0278791 A1 | 11/2009 | Slycke et al. | |
| 2009/0305213 A1 | 12/2009 | Burgkart et al. | |
| 2009/0326556 A1 | 12/2009 | Diolaiti | |
| 2010/0030111 A1 | 2/2010 | Perriere | |
| 2010/0071467 A1 | 3/2010 | Nasiri et al. | |
| 2010/0099066 A1 | 4/2010 | Mire et al. | |
| 2010/0120006 A1 | 5/2010 | Bell | |
| 2010/0167249 A1 | 7/2010 | Ryan | |
| 2010/0167254 A1 | 7/2010 | Nguyen | |
| 2010/0179428 A1 | 7/2010 | Pederson et al. | |
| 2010/0198141 A1 | 8/2010 | Laitenberger et al. | |
| 2010/0273135 A1 | 10/2010 | Cohen | |
| 2011/0027767 A1 | 2/2011 | Divinagracia | |
| 2011/0046915 A1 | 2/2011 | Hol et al. | |
| 2011/0060229 A1 | 3/2011 | Hulvershorn et al. | |
| 2011/0071419 A1 | 3/2011 | Liu et al. | |
| 2011/0202012 A1 | 8/2011 | Bartlett | |
| 2011/0207102 A1 | 8/2011 | Trotta et al. | |
| 2011/0236866 A1 | 9/2011 | Psaltis et al. | |
| 2011/0257596 A1 | 10/2011 | Gaudet | |
| 2011/0269109 A2 | 11/2011 | Miyazaki | |
| 2011/0282188 A1 | 11/2011 | Burnside et al. | |
| 2011/0294103 A1 | 12/2011 | Segal et al. | |
| 2011/0301500 A1 | 12/2011 | Maguire et al. | |
| 2012/0002014 A1 * | 1/2012 | Walsh | G06T 19/006 348/47 |
| 2012/0015336 A1 | 1/2012 | Mach | |
| 2012/0026307 A1 | 2/2012 | Price | |
| 2012/0034587 A1 | 2/2012 | Toly | |
| 2012/0130269 A1 | 5/2012 | Rea | |
| 2012/0148994 A1 | 6/2012 | Hori et al. | |
| 2012/0171652 A1 | 7/2012 | Sparks et al. | |
| 2012/0183238 A1 | 7/2012 | Savvides et al. | |
| 2012/0214144 A1 | 8/2012 | Trotta et al. | |
| 2012/0219937 A1 | 8/2012 | Hughes | |
| 2012/0238875 A1 | 9/2012 | Savitsky et al. | |
| 2012/0251987 A1 | 10/2012 | Huang et al. | |

(56) References Cited

U.S. PATENT DOCUMENTS

| | | | |
|---|---|---|---|
| 2012/0280988 A1 | 11/2012 | Lampotang et al. | |
| 2012/0282583 A1 | 11/2012 | Thaler et al. | |
| 2012/0293632 A1* | 11/2012 | Yukich | H04N 5/247 348/47 |
| 2012/0301858 A1 | 11/2012 | Park et al. | |
| 2012/0323520 A1 | 12/2012 | Keal | |
| 2013/0006178 A1 | 1/2013 | Pinho et al. | |
| 2013/0018494 A1 | 1/2013 | Amini | |
| 2013/0046489 A1 | 2/2013 | Keal | |
| 2013/0100256 A1 | 4/2013 | Kirk et al. | |
| 2013/0131503 A1 | 5/2013 | Schneider et al. | |
| 2013/0179110 A1 | 7/2013 | Lee | |
| 2013/0189658 A1 | 7/2013 | Peters et al. | |
| 2013/0197845 A1 | 8/2013 | Keal | |
| 2013/0198625 A1 | 8/2013 | Anderson | |
| 2013/0203032 A1 | 8/2013 | Bardsley | |
| 2013/0223673 A1* | 8/2013 | Davis | G06K 9/78 382/100 |
| 2013/0236872 A1 | 9/2013 | Laurusonis et al. | |
| 2013/0267838 A1 | 10/2013 | Fronk et al. | |
| 2013/0296691 A1 | 11/2013 | Ashe | |
| 2013/0308827 A1* | 11/2013 | Dillavou | G06T 7/20 382/107 |
| 2013/0323700 A1 | 12/2013 | Samosky et al. | |
| 2013/0342657 A1* | 12/2013 | Robertson | H04N 13/239 348/47 |
| 2014/0039452 A1 | 2/2014 | Bangera et al. | |
| 2014/0102167 A1 | 4/2014 | MacNeil et al. | |
| 2014/0120505 A1* | 5/2014 | Rios | G09B 23/30 434/219 |
| 2014/0121636 A1 | 5/2014 | Boyden | |
| 2014/0162232 A1 | 6/2014 | Yang et al. | |
| 2014/0212864 A1* | 7/2014 | Rios | G09B 23/30 434/270 |
| 2014/0240314 A1 | 8/2014 | Fukazawa et al. | |
| 2014/0244209 A1 | 8/2014 | Lee et al. | |
| 2014/0260704 A1 | 9/2014 | Lloyd et al. | |
| 2014/0278183 A1 | 9/2014 | Zheng et al. | |
| 2014/0278205 A1 | 9/2014 | Bhat et al. | |
| 2014/0278215 A1 | 9/2014 | Keal et al. | |
| 2014/0322683 A1 | 10/2014 | Baym et al. | |
| 2014/0349266 A1 | 11/2014 | Choi | |
| 2015/0079545 A1 | 3/2015 | Kurtz | |
| 2015/0182706 A1 | 7/2015 | Wurmbauer et al. | |
| 2015/0206456 A1* | 7/2015 | Foster | G09B 23/285 434/262 |
| 2015/0262512 A1 | 9/2015 | Rios et al. | |
| 2015/0352294 A1 | 12/2015 | O'Mahoney et al. | |
| 2015/0379899 A1 | 12/2015 | Baker et al. | |
| 2015/0379900 A1 | 12/2015 | Samosky et al. | |
| 2016/0000411 A1 | 1/2016 | Raju et al. | |
| 2016/0001016 A1 | 1/2016 | Poulsen et al. | |
| 2016/0155363 A1 | 6/2016 | Rios et al. | |
| 2016/0193428 A1 | 7/2016 | Perthu | |
| 2016/0213856 A1 | 7/2016 | Despa et al. | |
| 2016/0293058 A1 | 10/2016 | Gaillot et al. | |
| 2016/0374902 A1 | 12/2016 | Govindasamy et al. | |
| 2017/0136185 A1 | 5/2017 | Rios et al. | |
| 2017/0178540 A1 | 6/2017 | Rios et al. | |
| 2017/0186339 A1 | 6/2017 | Rios et al. | |
| 2017/0245943 A1 | 8/2017 | Foster et al. | |
| 2017/0252108 A1 | 9/2017 | Rios et al. | |
| 2018/0012516 A1 | 1/2018 | Rios et al. | |
| 2018/0068075 A1 | 3/2018 | Shiwaku | |
| 2018/0197441 A1 | 7/2018 | Rios et al. | |
| 2018/0240365 A1 | 8/2018 | Foster et al. | |
| 2018/0261125 A1 | 9/2018 | Rios et al. | |
| 2018/0261126 A1 | 9/2018 | Rios et al. | |
| 2019/0130792 A1 | 5/2019 | Rios et al. | |

FOREIGN PATENT DOCUMENTS

| | | |
|---|---|---|
| CA | 2865236 A1 | 9/2013 |
| CN | 2751386 Y | 1/2006 |
| CN | 201213049 Y | 3/2009 |
| CN | 102708745 A | 10/2012 |
| CN | 104703641 A | 6/2015 |
| CN | 105118350 A | 12/2015 |
| CN | 205541594 U | 8/2016 |
| CN | 106710413 A | 5/2017 |
| CN | 107067856 A | 8/2017 |
| DE | 202005021286 U1 | 9/2007 |
| EP | 0316763 A1 | 5/1989 |
| EP | 1504713 A1 | 2/2005 |
| EP | 1723977 A1 | 11/2006 |
| EP | 1884211 A2 | 2/2008 |
| EP | 2425416 B1 | 3/2015 |
| EP | 2538398 B1 | 8/2015 |
| EP | 2756857 B1 | 5/2016 |
| GB | 2288686 B | 7/1997 |
| GB | 2309644 A | 8/1997 |
| GB | 2508510 | 6/2014 |
| IN | 201202900 P1 | 11/2013 |
| JP | 2013-037088 A | 2/2013 |
| JP | 52-21420 | 6/2013 |
| JP | 2013-250453 A | 12/2013 |
| JP | 2014-153482 A | 8/2014 |
| KR | 2012009379 A | 2/2012 |
| KR | 20140047943 A | 4/2014 |
| KR | 10-1397522 B1 | 5/2014 |
| TW | 201207785 A | 2/2012 |
| WO | WO 00/53115 | 9/2000 |
| WO | WO 02/083003 | 10/2002 |
| WO | WO 2005/083653 | 9/2005 |
| WO | WO 2007/109540 | 9/2007 |
| WO | WO 2008/005315 A2 | 1/2008 |
| WO | WO 2008/122006 A1 | 10/2008 |
| WO | WO 2009/023247 A1 | 2/2009 |
| WO | WO 2009/049282 | 4/2009 |
| WO | WO 2009/094646 | 7/2009 |
| WO | WO 2009/141769 | 11/2009 |
| WO | WO 2011/043645 | 4/2011 |
| WO | WO 2011/127379 | 10/2011 |
| WO | WO 2011/136778 | 11/2011 |
| WO | WO 2012/075166 | 6/2012 |
| WO | WO 2012/088471 A1 | 6/2012 |
| WO | WO 2012/101286 | 8/2012 |
| WO | WO 2012/106706 | 8/2012 |
| WO | WO 2012/155056 | 11/2012 |
| WO | WO 2013/025639 | 2/2013 |
| WO | WO 2013/064804 A1 | 5/2013 |
| WO | WO 2014/070799 | 5/2014 |
| WO | WO 2014/100658 | 6/2014 |
| WO | WO 2015/109251 | 7/2015 |
| WO | WO 2015/110327 A1 | 7/2015 |
| WO | WO 2015/136564 | 9/2015 |
| WO | WO 2015/138608 | 9/2015 |
| WO | WO 2015/171778 | 11/2015 |
| WO | WO 2016/089706 | 6/2016 |
| WO | WO 2016/123144 A2 | 8/2016 |
| WO | WO 2016/162298 | 10/2016 |
| WO | WO 2016/191127 | 12/2016 |
| WO | WO 2017/048929 A1 | 3/2017 |
| WO | WO 2017/048931 A1 | 3/2017 |
| WO | WO 2017/050781 A1 | 3/2017 |
| WO | WO 2017/060017 A1 | 4/2017 |
| WO | WO 2017/070391 | 4/2017 |
| WO | WO 2017/151441 | 9/2017 |
| WO | WO 2017/151716 | 9/2017 |
| WO | WO 2017/151963 | 9/2017 |
| WO | WO 2017/153077 | 9/2017 |
| WO | WO 2018/136901 | 7/2018 |

OTHER PUBLICATIONS

Andraos et al., "Sensing your Orientation" Address 2007, 7 pp.
Arms, S.W., "A Vision for Future Wireless Sensing Systems," 44 pp., 2003.
Bao, et al., "A Novel Map-Based Dead-Reckoning Algorithm for Indoor Localization", J. Sens. Actuator Networks, 2014, 3, 44-63; doi:10.3390/jsan3010044, 20 pp., Jan. 3, 2014.

(56) References Cited

OTHER PUBLICATIONS

Benbasat et al., "An Inertial Measurement Framework for Gesture Recognition and Applications," I. Wachsmuth and T. Sowa (Eds.): GW 2001, Springer-Verlag Berlin Heidelberg, 12 pp., 2002.
Bergamini et al., "Estimating Orientation Using Magnetic and Inertial Sensors and Different Sensor Fusion Approaches: Accuracy Assessment in Manual and Locomotion Tasks", Oct. 2014, 18625-18649.
Brunet et al., "Uncalibrated Stereo Vision," A CS 766 Project, University of Wisconsin—Madison, 6 pp, Fall 2004, http://pages.cs.wisc.edu/~chaol/cs766/.
Brunet et al., "Uncalibrated Stereo Vision," A CS 766 Project, University of Wisconsin—Madison, 13 pp, Fall 2004, http://pages.cs.wisc.edu/~chaol/cs766/.
Desjardins, et al. "Epidural needle with embedded optical fibers for spectroscopic differentiation of tissue: ex vivo feasibility study", Biomedical Optics Express, vol. 2(6): pp. 1-10. Jun. 2011.
"EPGL Medical Invents Smart Epidural Needle, Nerve Ablation and Trigger Point Treatment Devices: New Smart Medical Devices Will Give Physicians Advanced Situational Awareness During Critical Procedures," EPGL Medical, dated Aug. 12, 2013, in 3 pages. Retrieved from http://www.prnewswire.com/news-releases/epgl-medical-invents-smart-epidural-needle-nerve-ablation-and-trigger-point-treatment-devices-219344621.html#.
"The EpiAccess System: Access with Confidence", EpiEP Epicardial Solutions, dated 2015, in 2 pages.
Esteve, Eric, "Why do you need 9D Sensor Fusion to support 3D orientation?", 5 pp., Aug. 23, 2014, https://www.semiwiki.com/forum/content/3794-why-do-you-need-9d-sensor-fusion-support-3d-orientation.html.
Grenet et al., "spaceCoder: a Nanometric 3D Position Sensing Device," CSEM Scientific & Technical Report, 1 page, 2011.
Helen, L., et al. "Investigation of tissue bioimpedance using a macro-needle with a potential application in determination of needle-to-nerve proximity", Proceedings of the 8th International Conference on Sensing Technology, Sep. 2-4, 2014, pp. 376-380.
Inition. Virtual Botox: Haptic App Simulated Injecting The Real Thing. Retrieved from http://inition.co.uk/case-study/virtual-botox-haptic-app-simulates-injecting-real-thing.
International Search Report and Written Opinion for Appl. No. PCT/US2017/020112, dated Jun. 9, 2017, 13 pages.
Kalvøy, H., et al., "Detection of intraneural needle-placement with multiple frequency bioimpedance monitoring: a novel method", Journal of Clinical Monitoring and Computing, Apr. 2016, 30(2):185-192.
Madgwick, Sebastian O.H., "An efficient orientation filter for inertial and inertial/magnetic sensor arrays," 32 pp., Apr. 30, 2010.
Microsoft, "Integrating Motion and Orientation Sensors," 85 pp., Jun. 10, 2013.
Miller, Nathan L., Low-Power, Miniature Inertial Navigation System with Embedded GPS and Extended Kalman Filter, MicroStrain, Inc., 12 pp., 2012.
MPU-9150 9-Axis Evaluation Board User Guide, Revision 1.0, 15 pp., May 11, 2011, http//www.invensense.com.
MPU-9150, Register Map and Descriptions, Revision 4.2, 52 pp., Sep. 18, 2013, http//www.invensense.com.
MPU-9150, Product Specification, Revision 4.3, 50 pp., Sep. 18, 2013, http://www.invensense.com.
PST Iris Tracker, Plug and Play, 3D optical motion tracking specifications, 1 p., Dec. 4, 2014, www.pstech.com.
PST Iris Tracker, Instruction Manual, 3D optical motion tracking specifications, 42 pp., Jul. 27, 2012, www.pstech.com.
Struik, Pieter, "Ultra Low-Power 9D Fusion Implementation: A Case Study," Synopsis, Inc., 7 pp., Jun. 2014.
Sutherland, et al. "An Augmented Reality Haptic Training Simulator for Spinal Needle Procedures," IEEE, 2011.
Varesano, Fabio, "Prototyping Orientation and Motion Sensing Objects with Open Hardware," Dipartimento di Informatica, Univ. Torino, http://www.di.unito.it/~varesano, Feb. 10, 2013, 4 pp.
Varesano, Fabio, "FreeIMU: An Open Hardware Framework for Orientation and Motion Sensing," Dipartimento di Informatica, Univ. Torino, http://www.di.unito.it/~varesano, Mar. 20, 2013, 10 pp.
"B-Smart disposable manometer for measuring peripheral nerve block injection pressures", Bbraun USA, 2016.
"A beginner's guide to accelerometers," Dimension Engineering LLC, accessed Jul. 11, 2018, in 2 pages, https://www.dimensionengineering.com/info/accelerometers.
"Accelerometer: Introduction to Acceleration Measurement," Omega Engineering, Sep. 17, 2015, 3 pages, https://www.omega.com/prodinfo/accelerometers.html.
"About the Journal", *J. Dental Educ., AM. Dental Educ. Ass'n*, 2019, http://www.jdentaled.org/content/about-us (last visited Oct. 9, 2019).
"Article Information", Wierinck et al., "Expert Performance on a Virtual Reality Simulation System", *J. Dental Educ., AM. Dental Educ. Ass'n*, 2019, http://www.jdental.org/content/71/6/759/tab-article-info (last visited Oct. 9, 2019).
Begg et al., "Computational Intelligence for Movement Sciences: Neural Networks and Other Emerging Techniques", *Idea Group Inc (IGI)*, 2006.
Comsa et al, "Bioluminescene imaging of point sources implants in small animals post mortem: evaluation of a method for estimating source strength and depth", *Phys. Med. Biol.*, Aug. 2007, vol. 52, No. 17, pp. 5415-5428.
Correa et al., "Virtual Reality Simulator for Dental Anesthesia Training in the Inferior Alveolar Nerve Block," Journal of Applied Oral Science, vol. 25, No. 4, Jul./Aug. 2017, pp. 357-366.
Garg et al., "Radial Artery cannulation-Prevention of pain and Techniques of cannulation: review of literature," The Internet Journal of Anesthesiology, vol. 19, No. 1, 2008, in 6 pages.
Hotraphinyo et al., "Precision measurement for microsurgical instrument evaluation", *Conference Proceedings of the 23rd Annual International Conference of the IEEE Engineering in Medicine and Biology Societyl*, 2001, vol. 4, pp. 3454-3457.
International Preliminary Report on Patentability for Appl. No. PCT/US2017/020112, dated Sep. 13, 2018, 8 pages.
Jafarzadeh et al., "Design and construction of an automatic syringe injection pump," Pacific Science Review A: Natural Science and Engineering 18, 2016, in 6 pages.
Kettenbach et al., "A robotic needle-positioning and guidance system for CT-guided puncture: Ex vivo results," Minimally Invasive Therapy and Allied Technologies, vol. 23, 2014, in 8 pages.
Krupa et al., "Autonomous 3-D positioning of surgical instruments in robotized laparoscopic surgery using visual servoing", *IEEE Trans. Robotics and Automation*, 2003, vol. 19, pp. 842-853.
Ladjal, et al., "Interactive Cell Injection Simulation Based on 3D Biomechanical Tensegrity Model," 2008 IEEE/RSJ International Conference on Intelligent Robots and Systems, in 9 pages.
Lee et al., "An Intravenous Injection Simulator Using Augmented Reality for Veterinary Education and its Evaluation," Proceedings of the 11th ACM SIGGRAPH International Conference on Virtual-Reality Continuum and its Applications in Industry, Dec. 2-4, 2012, in 4 pages.
Lee et al., "Augmented reality intravenous injection simulator based 3D medical imaging for veterinary medicine," The Veterinary Journal, 2013, vol. 196, No. 2, pp. 197-202.
Liu et al. "Robust Real-Time Localization of Surgical Instruments in the Eye Surgery Stimulator (EyeSi)", *Signal and Image Processing*, 2002.
Merril et al., "The Ophthalmic Retrobulbar Injection Simulator (ORIS): An Application of Virtual Reality to Medical Education", *Proc. Ann. Symp. Comput. Med. Care*, 1992, pp. 702-706.
Mukherjee et al., "A Hall Effect Sensor Based Syringe Injection Rate Detector", *IEEE 2012 Sixth Int'l Conf on Sensing Technol. (ICST)*, Dec. 18-21, 2012.
Petition for Inter Partes Review of U.S. Pat. No. 9,792,836, Pusuant to 35 U.S.C. §§ 311-19, 37 C.F.R. § 42.100 ET SEQ., IPR2020-00042, dated Oct. 11, 2019.
Patterson et al., "Absorption spectroscopy in tissue-simulating materials: a theoretical and experimental study of photon paths", Appl. Optics, Jan. 1995, vol. 34, No. 1, pp. 22-30.

(56) References Cited

OTHER PUBLICATIONS

Poyade et al., "Development of a Haptic Training Simulation for the Administration of Dental Anesthesia Based Upon Accurate Anatomical Data," Conference and Exhibition of the European Association of Virtual and Augmented Reality, 2014, in 5 pages.

Quio, "Smartinjector," available at https://web.archive.org/web/20161017192142/http://www.quio.com/smartinjector, Applicant believes to be available as early as Oct. 17, 2016, in 3 pages.

State Electronics, "Sensofoil Membrane Potentiometer," Product Information and Technical Specifications, in 6 pages.

Truinject Corp., "Smart Injection Platform," http://truinject.com/technology/, printed Jan. 13, 2018, in 3 pages.

Van Sickle et al., "Construct validation of the ProMIS simulator using novel laparoscopic suturing task", *Surg Endosc*, Sep. 2005, vol. 19, No. 9, pp. 1227-1231.

Wierinck et al., "Expert Performance on a Virtual Reality Simulation System", *71 J. Dental Educ.*, Jun. 2007, pp. 759-766.

Wik et al., "Intubation with laryngoscope versus transillumination performed by paramedic students on mainkins and cadavers", *Resuscitation*, Jan. 1997, vol. 33, No. 3, pp. 215-218.

\* cited by examiner

SYSTEM FOR DETERMINING A THREE-DIMENSIONAL POSITION OF A TESTING TOOL

INCORPORATION BY REFERENCE TO ANY PRIORITY APPLICATIONS

Any and all applications for which a foreign or domestic priority claim is identified in the Application Data Sheet as filed with the present application are hereby incorporated by reference in their entirety under 37 CFR 1.57.

This application claims benefit of U.S. Provisional Patent Application No. 62/302,328, filed Mar. 2, 2016, and entitled "SYSTEM FOR DETERMINING A THREE-DIMENSIONAL POSITION OF A TESTING TOOL," the entire disclosure of which is hereby incorporated by reference and made part of this specification.

BACKGROUND

The present disclosure generally relates to a system for practicing injections on a human or animal training model.

A variety of medical injection procedures are often performed in prophylactic, curative, therapeutic, or cosmetic treatments. Injections may be administered in various locations on the body, such as under the conjunctiva, into arteries, bone marrow, the spine, the sternum, the pleural space of the chest region, the peritoneal cavity, joint spaces, and internal organs. Injections can also be helpful in administering medication directly into anatomic locations that are generating pain. These injections may be administered intravenously (through the vein), intramuscularly (into the muscle), intradermally (beneath the skin), subcutaneously (into the fatty layer of skin), or by way of intraperitoneal injections (into the body cavity). Injections can be performed on humans as well as animals. The methods of administering injections typically vary for different procedures and may depend on the substance being injected, the needle size, or the area of injection.

Injections are not limited to treating medical conditions, but may be expanded to treating aesthetic imperfections, restorative cosmetic procedures, procedures for treating migraine, depression, epidurals, orthopedic procedures, self-administered injections, in vitro procedures, or other therapeutic procedures. Many of these procedures are performed through injections of various products into different parts of the body. The aesthetic and therapeutic injection industry comprises two main categories of injectable products: neuromodulators and dermal fillers. The neuromodulator industry commonly utilizes nerve-inhibiting products such as Botox®, Dysport®, and Xeomin®, among others. The dermal filler industry utilizes products administered by providers to patients for orthopedic, cosmetic and therapeutic applications, such as, for example, Juvederm®, Restylane®, Belotero®, Sculptra®, Artefill®, Voluma®, Kybella®, Durolane®, and others. The providers or injectors may include plastic surgeons, facial plastic surgeons, oculoplastic surgeons, dermatologists, orthopedist, primary care givers, psychologist/psychiatrist, nurse practitioners, dentists, and nurses, among others.

SUMMARY

One of the problems in the administration of injections is that there is no official certification or training process. Anyone with a minimal medical related license may inject a patient. These "injectors" may include primary care physicians, orthopedist, dentists, veterinarians, nurse practitioners, nurses, physician's assistants, aesthetic spa physicians, therapeutic or the patient for self-administered injections. However, the qualifications and training requirements for injectors vary by country, state, and county. For example, in most states in the United States, the only requirement to inject patients with neuromodulators and/or fillers is a nursing degree or medical degree. This causes major problems with uniformity and expertise in administering injections. The drawbacks resulting from a lack of uniformity in training and expertise are widespread throughout the medical industry. Doctors and practitioners often are not well trained in administering injections for diagnostic, therapeutic, and cosmetic purposes. This lack of training often leads to instances of chronic pain, headaches, bruising, swelling or bleeding in patients.

Current injection training options are classroom-based, with hands-on training performed on live models. The availability of models is limited. Moreover, even when available, live models are limited in the number and type of injections that may be performed on them. The need for live models is restrictive because injectors are unable to be exposed to a wide and diverse range of situations in which to practice. For example, it may be difficult to find live models with different skin tones or densities. This makes the training process less effective because patients often have diverse anatomical features as well as varying prophylactic, curative, therapeutic, or cosmetic needs. Live models are also restrictive because injectors are unable to practice injection methods on internal organs due to health considerations. As a result of these limited training scenarios, individuals seeking treatments involving injections have a much higher risk of being treated by an inexperienced injector. This may result in low patient satisfaction with the results, or in failed procedures. In many instances, patients have experienced lumpiness from incorrect dermal filler injections. Some failed procedures may result in irreversible problems and permanent damage to a patient's body. For example, patients have experienced vision loss, direct injury to the globe of the eye, and brain infarctions where injectors have incorrectly performed dermal filler procedures. Other examples of side effects include inflammatory granuloma, skin necrosis, endophthalmitis, injectable-related vascular compromise, cellulitis, biofilm formation, subcutaneous nodules, fibrotic nodules, other infections, and death.

The present disclosure provides for a system for prophylactic, curative, therapeutic, acupuncture, or cosmetic injection training and certification. The system can be configured to use at least two cameras to track the position and/or trajectory of a testing tool with three-dimensional location information, for example, an x-y-z location, of the tip of the testing tool when inserted into a training model. In some embodiments, the system can take into account bending of light by at least a portion of the training model to provide more accurate three-dimensional location information. In some embodiments, the system can reduce, minimize or eliminate variations in camera parameters, including intrinsic and extrinsic parameters, without a need for calibrating the three-dimensional position calculations.

In some embodiments, an injection training system can include an anatomic training model, the training model including one or more resilient layers configured to receive a tip of a testing tool and a rigid innermost layer, the one or more resilient layers and rigid innermost layer being optically transmissive, the innermost layer defining a cavity within the training model; a first camera mounted within the cavity, the first camera having a first central viewing axis; a second camera mounted within the cavity, the second camera having a second central viewing axis extending at an angle offset from the first central viewing axis, the first and second cameras each having fields of view configured to detect light emitting from the tip of the testing tool; and a processing unit configured to determine a three-dimensional position of the tip of the testing tool based on locations of the centroids of emitted light detected in the fields of view of the first and second cameras and refraction of the emitted light through the innermost layer. The system can further comprise a support structure configured for mounting the first and second cameras. The testing tool can comprise a syringe, a biopsy needle, a catheter, or another type of injection device. The system can further comprise an output device in communication with the processing unit and/or the first and second cameras and configured to generate information regarding injection parameters based on the communications. The first central viewing axis can be at a ninety degree angle with respect to the second central viewing axis. The first camera can be positioned in a superior portion of the anatomic training model and the second camera can be positioned in an inferior portion of the anatomic training model. The first central viewing axis can extend anteriorly and inferiorly. The second central viewing axis can extend anteriorly and superiorly. The one or more resilient layers can comprise at least one elastomeric layer. The training model further can comprise an opaque outer skin layer. The training tool can comprise an optical fiber configured to emit light from the tip of the training tool.

In some embodiments, a method for providing injection training can include determining whether an area of emitted light from a testing tool is within a field of view of a first camera and a second camera positioned in an anatomical training model, the training model including one or more resilient layers configured to receive a tip of an testing tool and a rigid innermost layer, the one or more resilient layers and rigid innermost layer being optically transmissive, the first and second cameras position within a cavity defined by the innermost layer; finding a location of a centroid of the area of emitted light from the field of view of each of the first and second cameras; tracing the light from the location of the centroid in each of the first and second cameras toward the innermost layer; adjusting the light tracing from each of the first and second cameras by refraction of the light through the innermost layer; recording from the adjusted light tracing a first line segment from an outer surface of the innermost layer to an outer surface of the training model for the first camera and a second line segment from an outer surface of the innermost layer to an outer surface of the training model for the second camera; and calculating a three-dimensional position of the tip of the testing tool by calculating a mid-point of nearest points along each of the first and second line segments to the other line segment. The adjusting can comprise adjusting the light tracing by a first refraction angle at an interface between the cavity and an inner surface of the innermost layer and a second refraction angle at an interface between an outer surface of the innermost layer and an inner surface of the one or more resilient layers. The method can further comprise repeating the determining, finding, tracing, adjusting, recording and calculating to track multiple locations of the tip of the testing tool over time. The tracking of the multiple locations can further comprise animating a trajectory of the injection on an output device. When the location of the centroid of the area of emitted light from the field of view of the first camera is known, the finding of the location of the centroid of the area of emitted light from the field of view of the second camera can comprise determining a feasible light detection region of the second camera based on end points of the first line segment for the first camera, the feasible light detection region being smaller than the field of view of the second camera. When light is not detected in the feasible light detection, the finding of the location of the centroid of the area of emitted light from the field of view of the second camera can further comprise determining a subsequent feasible light detection region based on a length of the testing tool.

In some embodiments, an injection training system can include an anatomic training model, the training model configured to receive a tip of a testing tool, the training model comprising an inner cavity; a first camera mounted within the cavity, the first camera having a first central viewing axis, wherein the first camera has a first plurality of intrinsic and/or extrinsic parameters; and a processing unit configured to determine a location of a centroid of emitted light detected in the field of view of the first camera, the light being emitted from the tip of the testing tool at a known three-dimensional position, wherein the processing unit is further configured to adjust the first plurality of intrinsic and/or extrinsic parameters based on one or more reference three-dimensional positions and corresponding locations of the centroid of emitted light. The system can further comprise a second camera mounted within the cavity, the second camera having a second central viewing axis extending at an angle offset from the first central viewing axis, the camera having a second set plurality of intrinsic and/or extrinsic parameters. The processing unit can be configured to adjust the second plurality of intrinsic and/or extrinsic parameters based on the one or more reference three-dimensional positions and corresponding locations of the centroid of emitted light. The first camera can be positioned in a superior portion of the anatomic training model and the second camera can be positioned in an inferior portion of the anatomic training model. The first central viewing axis can extend anteriorly and inferiorly. The second central viewing axis can extend anteriorly and superiorly. The first central viewing axis can be at a ninety degree angle with respect to the second central viewing axis. The testing tool can comprise a syringe, a biopsy needle, a catheter, or another type of injection device. The system can further comprise an output device in communication with the processing unit and/or the first and second cameras and configured to generate information regarding injection parameters based on the communications. The training model can comprise one or more resilient layers configured to receive the tip of a testing tool and a rigid innermost layer, the one or more resilient layers and rigid innermost layer being optically transmissive. The training model further can comprise an opaque outer skin layer. The training tool can comprise an optical fiber configured to emit light from the tip of the training tool.

In some embodiments, a method for providing injection training can include determining a plurality of intrinsic and/or extrinsic parameters of a first camera positioned in an anatomical training model configured to receive a tip of an testing tool, the camera configured to detected area of light emitted from the tip of the testing tool in a field of view of the first camera; finding a location of a centroid of the area of the emitted light in the field of view of the first camera, wherein a three-dimensional position of the tip of the testing tool is known; comparing the location of the centroid on the first camera with locations of centroid corresponding to one or more reference three-dimensional positions; and adjusting, if needed, the plurality of intrinsic and/or extrinsic parameters of the first camera based on the comparison. The method can further comprise determining a plurality of intrinsic and/or extrinsic parameters of a second camera positioned in the anatomical training model, the second camera having a central viewing axis extending at an angle offset from a central viewing axis of the first camera; finding a location of a centroid of the area of the emitted light in the field of view of the second camera, wherein a three-dimensional position of the tip of the testing tool is known; comparing the location of the centroid on the second camera with locations of centroid corresponding to one or more reference three-dimensional positions; and adjusting, if needed, the plurality of intrinsic and/or extrinsic parameters of the second camera based on the comparison. The intrinsic parameters can comprise one or more of focal length, image sensor format, principal point, and/or lens distortion. The extrinsic parameters can comprise one or more of position of a camera, rotation of a camera, and/or coordinate system transformations from coordinates of a chosen coordinate system to 3D camera coordinates. The adjusting can eliminate a need to calibrate future determination of a three-dimensional position of the tip of the testing tool using the training system. The reference three-dimensional positions of the tip of the testing tool and the corresponding locations of centroids of the areas of emitted light can be empirical data obtained by tracing the emitted light away from a location of a centroid in the first camera and a location of a centroid in the second camera respectively.

In some embodiments, an injection training system can include a first camera mounted within an anatomic training model, the anatomic training model configured to receive a tip of a testing tool, the first camera having a first central viewing axis; a second camera mounted within the anatomic training model, the second camera having a second central viewing axis extending at an angle offset from the first central viewing axis, the first and second cameras positioned at a distance from each other, the first and second cameras each having fields of view configured to detect light emitting from the tip of the testing tool; and a processing unit configured to determine a three-dimensional position of the tip of the testing tool based at least on locations of the centroids of emitted light detected in the fields of view of the first and second cameras. The first central viewing axis can be at between about 1 to about 90 degree angle with respect to the second central viewing axis. The first central viewing axis can be at a ninety degree angle with respect to the second central viewing axis. The first camera can be positioned in a superior portion of the anatomic training model and the second camera can be positioned in an inferior portion of the anatomic training model. The first central viewing axis can extend anteriorly and inferiorly. The second central viewing axis can extend anteriorly and superiorly. The system can further comprise a support structure configured for mounting the first and second cameras. The first camera can be mounted on a superior portion of the mounting camera. The second camera can be mounted on an inferior portion of the mounting camera. The testing tool can comprise a syringe, a biopsy needle, a catheter, or another type of injection device. The system can further comprise an output device in communication with the processing unit and/or the first and second cameras and configured to generate information regarding injection parameters based on the communications. The training model can comprise one or more resilient layers configured to receive the tip of a testing tool and a rigid innermost layer, the one or more resilient layers and rigid innermost layer being optically transmissive. The training model further can comprise an opaque outer skin layer. The testing tool can comprise an optical fiber configured to emit light from the tip of the training tool. The processing unit can be further configured to determine the three-dimensional position of the tip of the testing tool based refraction of the emitted light through the training model.

Any feature, structure, or step disclosed herein can be replaced with or combined with any other feature, structure, or step disclosed herein, or omitted. Further, for purposes of summarizing the disclosure, certain aspects, advantages, and features of the inventions have been described herein. It is to be understood that not necessarily any or all such advantages are achieved in accordance with any particular embodiment of the inventions disclosed herein. No individual aspects of this disclosure are essential or indispensable.

BRIEF DESCRIPTION OF THE DRAWINGS

Various embodiments are depicted in the accompanying drawings for illustrative purposes, and should in no way be interpreted as limiting the scope of the embodiments. Furthermore, various features of different disclosed embodiments can be combined to form additional embodiments, which are part of this disclosure. Corresponding numerals indicate corresponding parts.

DETAILED DESCRIPTION

Aspects of the disclosure are provided with respect to the figures and various embodiments. One of skill in the art will appreciate, however, that other embodiments and configurations of the devices and methods disclosed herein will still fall within the scope of this disclosure even if not described in the same detail as some other embodiments. Aspects of various embodiments discussed do not limit scope of the disclosure herein, which is instead defined by the claims following this description.

The term "bending of light" in this disclosure includes its broad ordinary meanings understood by a person of ordinary skill in the art, which include refraction of light.

Figure 1:
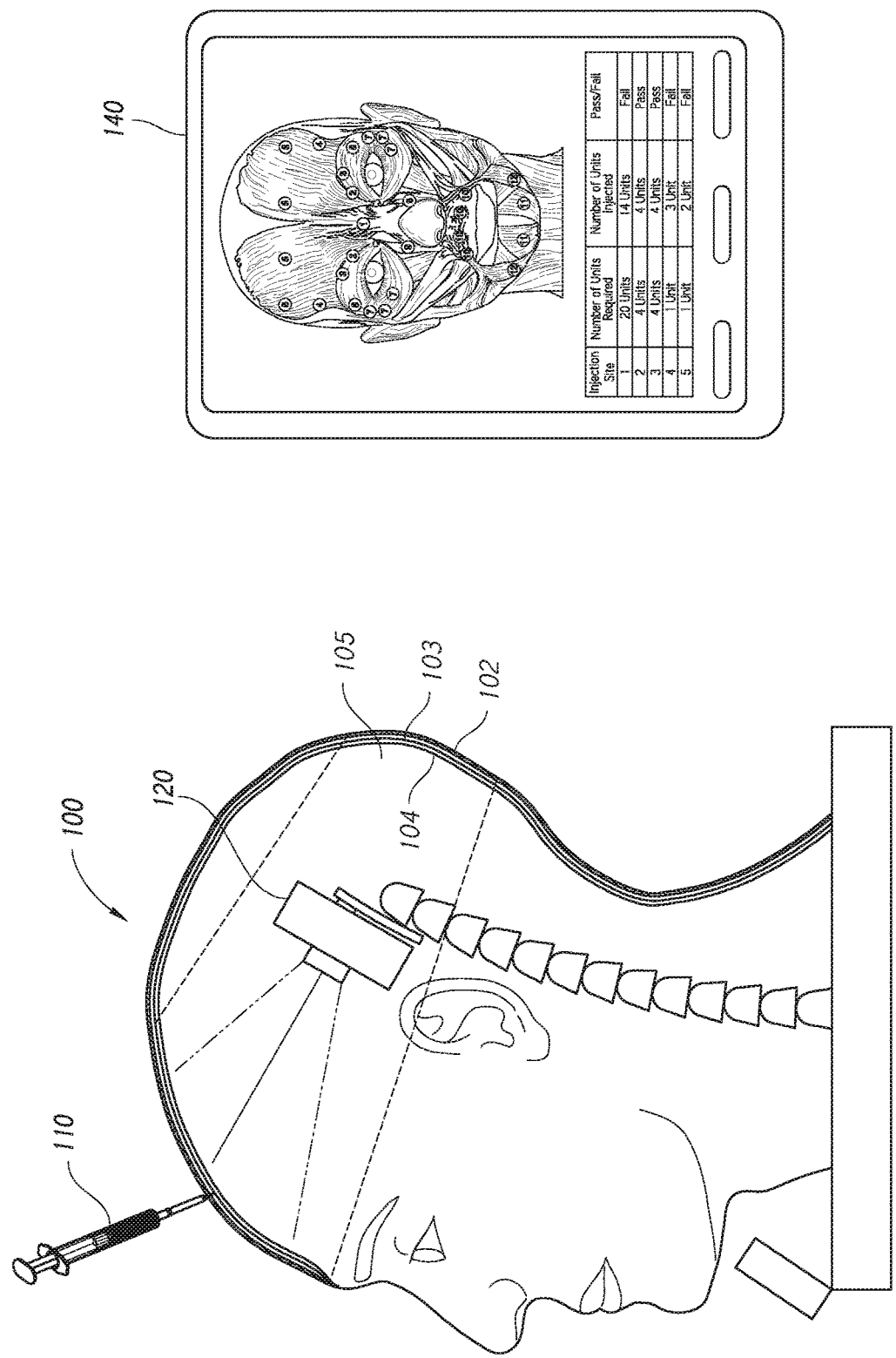
FIG. 1 is a schematic illustration of an embodiment of a system including a training model, a testing tool, and an output device.

As shown in FIG. 1, the training system can include a training model 100, one or more cameras 120 associated with the training model, a testing tool 110, and optionally an output device 140 that can run an application that receives communications from the training apparatus or camera and generates information regarding injection parameters based on the communications from the injection apparatus or camera. The training model 100 can have features of an anatomically accurate model of a human (or animal) or human (or animal) body part necessary for injection training. The training model 100 shown herein is modeled after a human head. However, in other implementations, the training model 100 may be modeled based on any anatomical part (including internal organs) of a human or animal.

The training model 100 can include a base or inner or innermost layer 104 and one or more elastomeric layers 103. The base layer 104 can include a rigid material in order to provide structural support to the training model 100. In some embodiments, the tip of the injection tool 110 does not penetrate the rigid base layer 104. The base layer 104 can be optically transmissive. For example, the base layer 104 can be transparent or translucent. In some embodiments, the base layer 104 can include plexiglass, other similar acrylic glass, or other glass or glass-like materials. The base layer 104 can define a cavity 105 to accommodate the one or more cameras 120. One or more elastomeric layers 103 may be positioned between the base layer 104 and the outer layer 102. Each elastomeric layer 103 may have different properties to simulate different types of tissue. The elastomeric layers can be optically transmissive (for example, translucence or transparent). An opaque or outer layer 102 can cover the outer-most elastomeric layer to mimic the skin.

In the illustrated example, the testing tool 110 is in the form of a syringe, but the testing tool 110 can include other needle-based devices or catheter devices. The testing tool 110 can include a light source that emits light at the head of the needle, for example, using a fiber optic in the needle. The light source may be one or more LEDs, laser diodes, or any other light emitting device or combination of devices.

The one or more cameras 120 may be placed within the training model 100. As shown in FIG. 1, the one or more cameras 120 are position within the cavity 105. As used herein, the term camera can extend to the use of any light detectors or light detection devices, including, for example, light sensors, photodiodes, infrared, polarization, fluorescent or ultraviolet light or thermal imaging cameras or other devices used to detect the presence or absence of visible or non-visible light.

The camera(s) 120 can send the information detected to a processing unit included in the system. For example, the processing unit may be on the camera(s) 120, the training model 100, the output device 140, or on a separate apparatus. The processing unit can communicate with the output device 140, which can display parameters associated with the injection. The output device 140 can include any type of display useful to a user, such as, for example, a tablet, phone, laptop or desktop computer, television, projector or any other display technology.

Additional information on the injection apparatus and training system can be found in U.S. Pat. No. 8,764,449, filed Oct. 30, 2013, titled "SYSTEM FOR COSMETIC AND THERAPEUTIC TRAINING" and U.S. Publication No. 2014/0212864, filed Mar. 31, 2014, titled "INJECTION TRAINING APPARATUS USING 3D POSITION SENSOR," the entirety of each of which is hereby incorporated by reference and made part of this specification.

According to some embodiments of the present disclosure, the apparatus can include a three-dimensional (3D) tracking system configured to determine a location of the tip of the testing tool in one of the elastomeric layers. The location can be an x-y-z position of the tip of the injection tool. In some embodiments, the system may track a depth of insertion of the testing tool using an x-y-z position of the tip of the testing tool. The tracking system can determine the location of the tip of the testing tool by tracking the light emitted from the tip of the testing tool.

Figure 2:
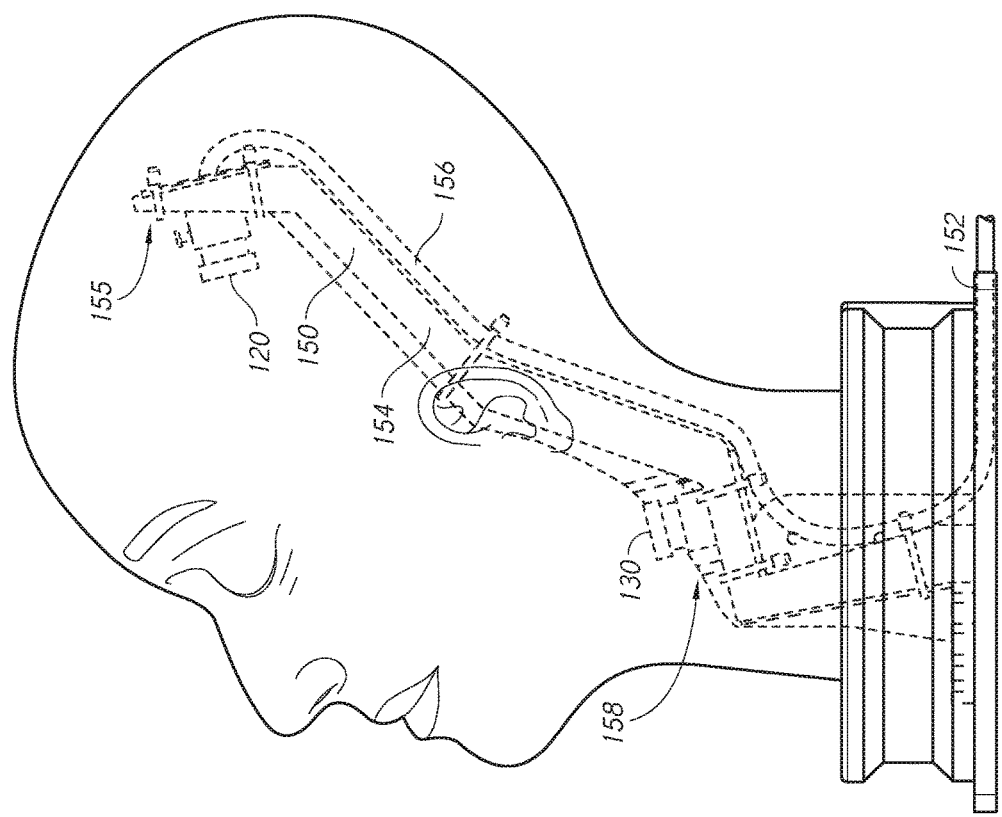
FIG. 2 illustrates a perspective view of an embodiment of a training model.
Figure 3A:
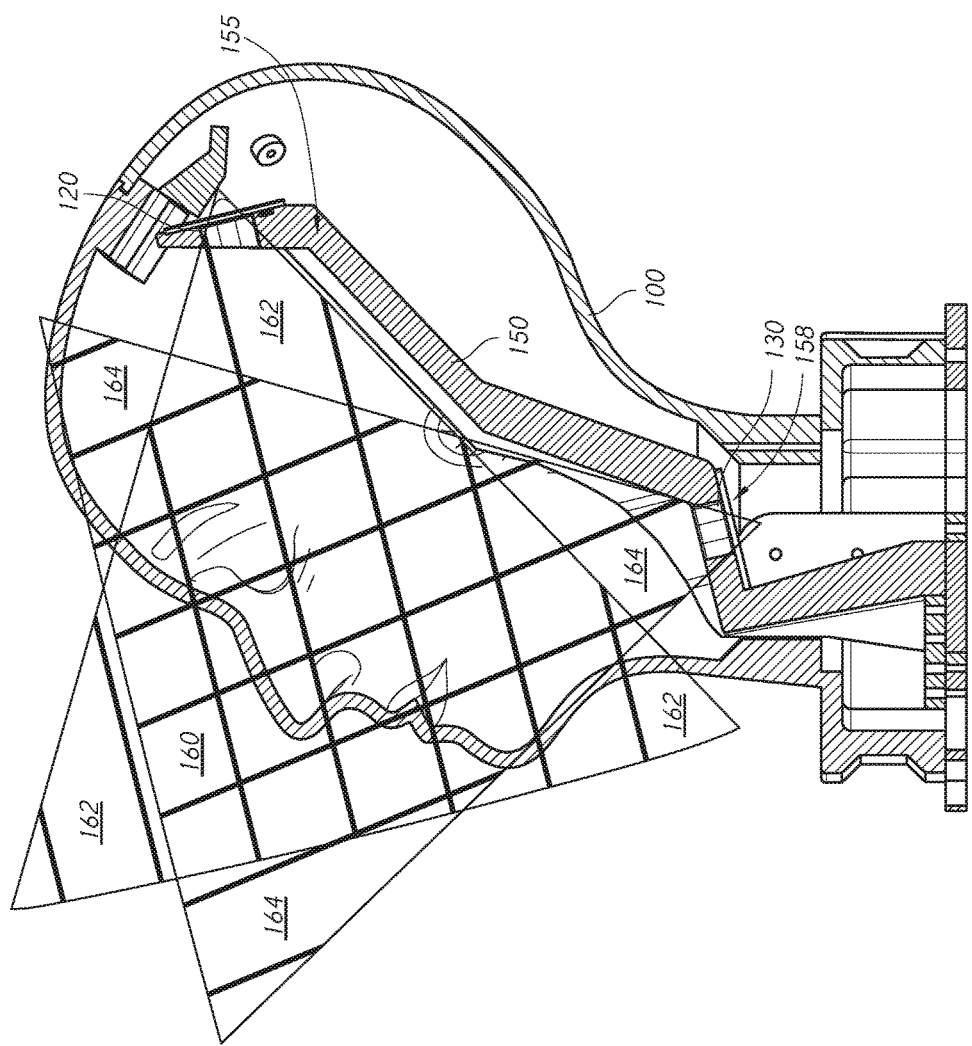
FIG. 3A illustrates schematically a cross-sectional view of an embodiment of a training model with two cameras.
Figure 3B:
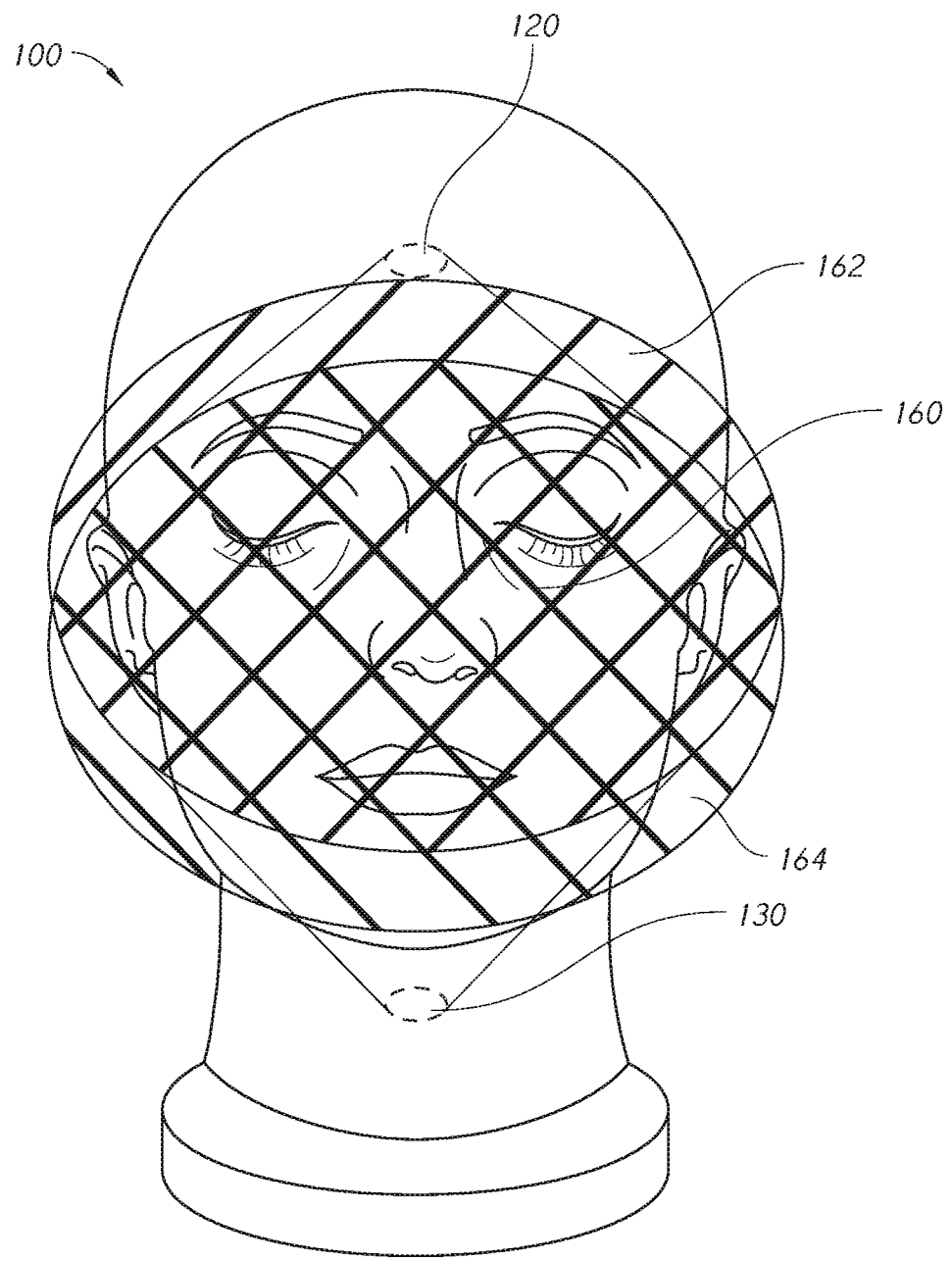
FIG. 3B illustrates schematically a front view of an embodiment of a training model with two cameras.

As shown in FIGS. 2 and 3A-B, the tracking system can include at least two cameras 120, 130. The two cameras 120, 130 can be mounted to or otherwise supported by a support structure 150. In the illustrated embodiment, the support structure 150 is a free-standing structure that the training model 100 can be positioned over. The support structure 150 can include a base 152 designed to rest on a tabletop or other surface and a mounting portion 154 extending generally upward from the base 152. The mounting portion 154 can be configured to receive the cameras 120, 130. Camera cabling 156 can be secured along a length of the mounting portion 154. Although the example illustrates a single, free-standing support structure 150, each camera 120, 130 may be mounted directly to the training model 100 and/or mounted to separate and distinct support structures.

The support structure 150 can be shaped to position the first camera 120 at an angle relative to the second camera 130. For example, the mounting portion 154 can include a first portion 155 configured to be positioned in a superior portion of the training model 100 and a second portion 158 configured to be positioned in an inferior portion of the training model 100. The first portion 155 can be angled with respect to the second portion 158, such that a first central viewing axis of the first camera 120 is at an angle relative to a second central viewing axis of the second camera 130. In some configurations, the first central viewing axis of the first camera 120 can be positioned at a 90 degree angle with respect to the second central viewing axis of the second camera 130. Positioning the cameras at a 90 degree angle with respect to each other can be useful to determine the three-dimensional position of the tip of the testing tool 110 using the process(es) described below, as maximum resolution of an x-y-z position can be a function of the angle between the first and second cameras 120, 130.

As shown in FIG. 2, the first camera 120 can be positioned in a superior portion of training model 100, such that a first central viewing axis of the first camera 120 extends in an anterior and/or inferior direction. For example, the first central viewing axis can be offset from the transverse axis (along the x-axis) of the training model 100 by about 5 to 20 degrees such that the first central viewing axis extends anteriorly and inferiorly. The second camera 130 can be positioned in an inferior portion of the training model 100 such that a second central viewing axis of the second camera 130 extends in an anterior and/or superior direction. For example, the second central viewing axis can be offset from the longitudinal axis (along the y-axis) of the training model 100 by about 5 to 20 degrees, such that the second central viewing axis extends anteriorly and superiorly.

FIGS. 3A and 3B illustrate overlapping of viewing regions of the first and second cameras 120, 130, in side and front views, respectively. The viewing regions of the first and second cameras 120, 130 are configured to overlap as much as allowed by the size of the cavity 105 and the mounting structure 150. Greater overlapping of the viewing regions can advantageously improve the range of injection depth and angle that can be monitored by the 3D tracking system. FIG. 3A schematically illustrates a field of view for each camera 120, 130 from a side view. Region 160 represents the overlapping field of view for the first and second cameras 120, 130. Regions 162 represent the field of view only viewable by the first camera 120, and regions 164 represent the field of view only viewable by the second camera 130. FIG. 3B schematically illustrates a field of view for each camera 120, 130 from a front view. Region 160 represents the overlapping field of view for the first and second cameras 120, 130. Regions 162 represent the field of view only viewable by the first camera 120, and regions 164 represent the field of view only viewable by the second camera 130. In this configuration, the cameras 120, 130 are positioned to maximize the overlapping field of view 160 covering the portion of the anterior face of the head, which can compass most of the expected injection locations. However, depending on the tilt and/or shape of the training model 100, the position and/or angle of the cameras may change to maximize the surface area of the potential injection area that can be seen by both cameras.

Several factors relating to the relative positions of the cameras in the training model are at play here. Specifically, the smaller the distance between the two cameras, the greater is the overlap of the viewing fields of these two cameras. However, the further apart are the two cameras, the better the resolution of the 3D position of an object that shows up in the viewing fields of the cameras. In addition, placing the two cameras at a non-zero angle to each other improves the resolution of the 3D positions of the object, but may result in a smaller overlap of the viewing fields. The embodiments described herein advantageously position the two cameras such that their viewing fields can overlap over substantially an entire injection region of the training model, but are relatively far apart and at a non-zero angle to each other to improve the resolution of the 3D positions of the tip of the injection tool. In some embodiments, one or both of the first and second cameras can be positioned anywhere along the mounting structure or within the training model. In some embodiments, the cameras can be at an angle of between about 1 degree to about 90 degree with respect to each other.

Returning to FIG. 1, when in use, the tip of the testing tool 110 is inserted into an elastomeric layer 103 of the training model 100 after the tip of the testing tool 110 penetrates the outer layer 102. As the elastomeric layer(s) and the base layer 104 of the training model 100 are optically transmissive, light emitted from the tip of the testing tool 110 may visible from the first camera 120 and/or the second camera 130. As explained in greater detail below, the system can determine a 3D location, such as an x-y-z location, of the tip of the testing tool 110 when the light emitted from the tip of the testing tool 110 is visible from both the first camera 120 and the second camera 130. In some embodiments, the location can be output to the output device 140. The location may be provided as an image and/or animation of the tip of the testing tool 110 passing through the training model 100.

3D Location Determination

Figure 4A:
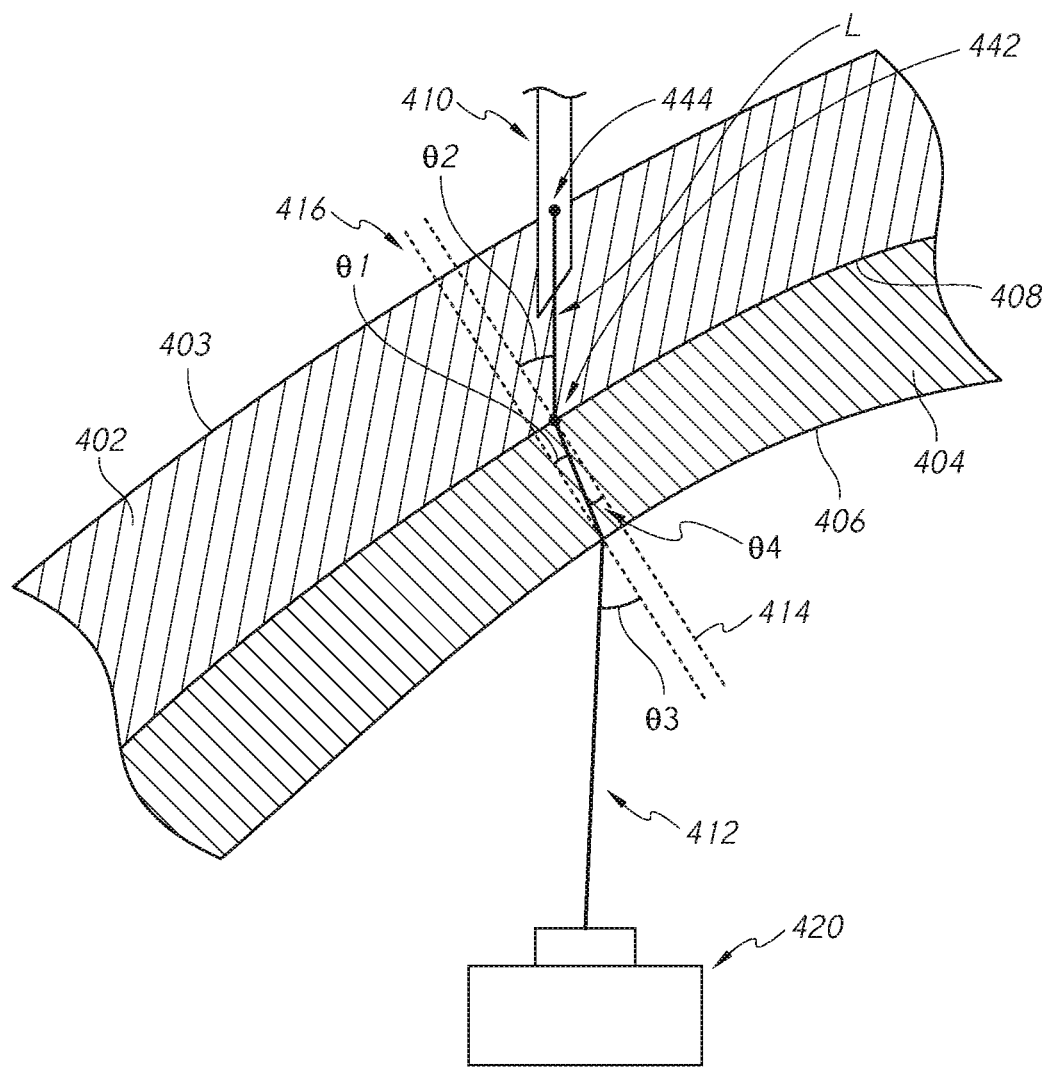
FIG. 4A illustrates schematically bending of light by a portion of a training model according to an embodiment of the present disclosure.
Figure 4B:
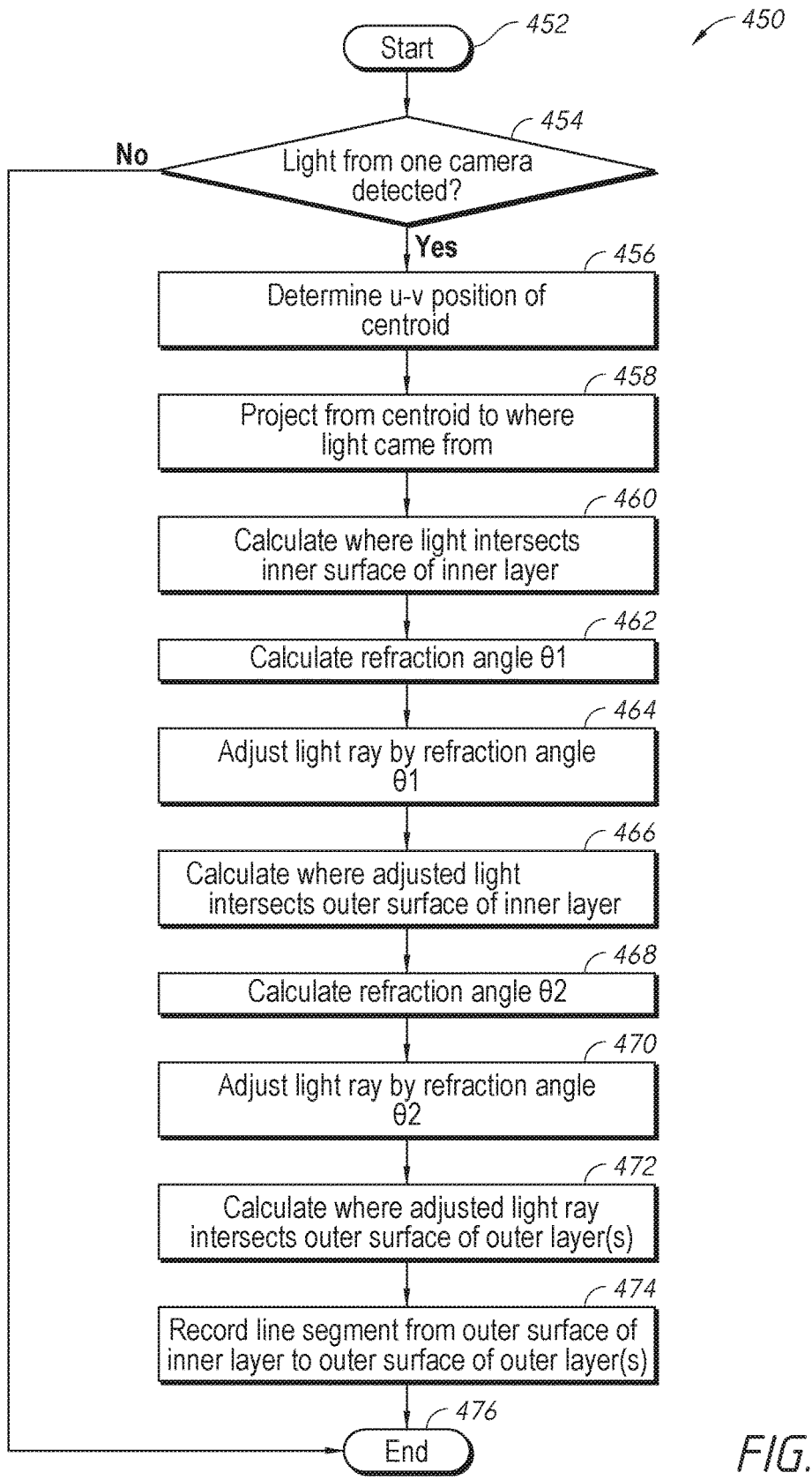
FIG. 4B is an example process for making intermediate determinations of a three-dimensional location of a tip of a testing tool.
Figure 5:
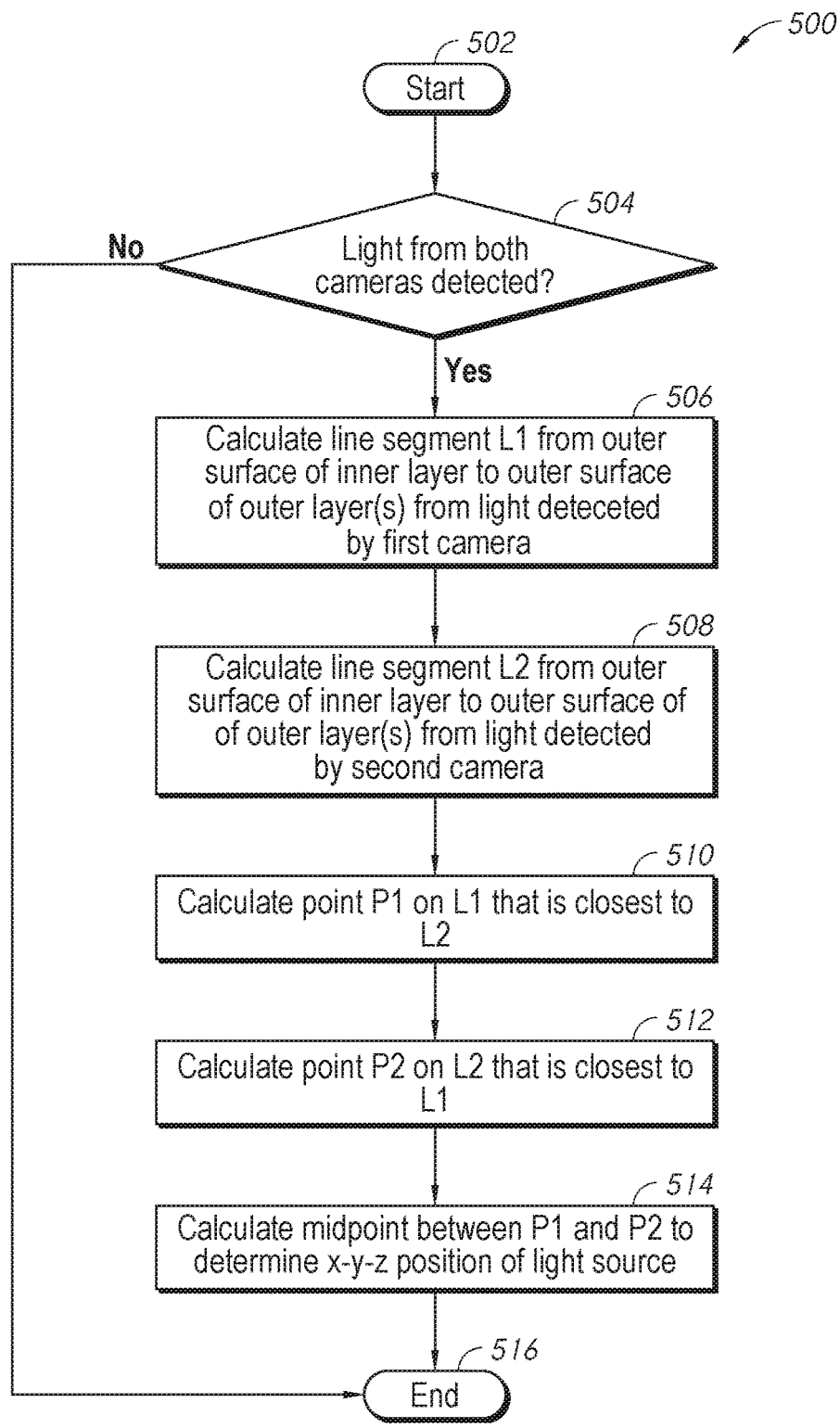
FIG. 5 is an example process that can be implemented to determine a three-dimensional location of a tip of a testing tool.

Determination of a 3D location of the tip of the testing tool will now be described with reference to FIGS. 4A-B and 5. FIG. 4A schematically illustrates a light path 412 from the tip of the testing tool 400 to one of the cameras 420. Other details of the training model including the opaque outer layer, the mounting structure and the second camera are omitted in FIG. 4A for clarity of illustration. FIG. 4B illustrates a process 450 that the training system can use for making intermediate determinations of the 3D location of the tip of the injection tool 410 of FIG. 4A. FIG. 5 illustrates a process 500 that may be implemented by the training system to determine a position (e.g., x-y-z position) of the tip of the testing tool 410 using the intermediate determinations obtained by the process 450.

Turning to FIG. 4A, when a tip of the injection tool 410 punctures an optically transmissive elastomeric layer 402 of the training model, light from the tip of the injection tool 410 can travel toward the cavity of the training model and be detected by the camera 420 positioned in the cavity. The light path 412 can travel through at least 3 types of medium, which are the elastomeric layer 402, the rigid inner layer 404, and the air within the cavity. At a boundary or interface between each medium, the light path 412 can be refracted because of different refractive indices of the media due at least to the different densities of the media. As illustrated in FIG. 4A, when the light path 412 hits an outer surface 408 of the rigid inner layer 404 at a non-zero angle of incidence θ2, the light path 412 can bend toward an axis 414 normal to the interface 408, that is, the angle of refraction θ4 being smaller than the angle of incidence θ2. This is when the refractive index of the rigid inner layer 404 is higher than the refractive index of the elastomeric layer 402. If the refractive index of the rigid inner layer 404 is lower than the refractive index of the elastomeric layer 402, the light path 412 can bend away from the axis 414. Similarly, when the light path 412 hits the inner surface 406 of the rigid inner layer 404, the light path 412 can bend away from an axis 416 normal to the interface 406, that is, the angle of incidence θ1 being smaller than the angle of refraction θ3, because air generally has a lower refractive index than a solid medium. In some embodiments, the cavity of the training model can have a higher refractive index than the rigid inner layer 404 so that the light path bends toward the axis 416.

The processes described below for determining the 3D location of the tip of the testing tool can be based on the principle of tracing a light path backwards away from a pixel in a viewing field of a camera and determining intersection of the light path with objects, staring from a nearest object. FIG. 4B illustrates the computer-implemented process 450 for tracing the light path after the light is detected in a viewing region of the camera. The process 450 starts at block 452. At decision block 454, the processing unit can determine whether light emitted from the tip of the testing tool is within the field of view of either the camera. If light is not within the field of view of the camera, the tip of the testing tool may not be within the elastomeric layer(s), and the process can proceed to the end at block 476. If the emitted light is within the field of view of the camera, the processing unit can proceed to determine a centroid pixel value, such as a u-v position of the detected light at block 456. After obtaining the centroid pixel value, the processing unit can project the light from the centroid backward toward where the light came from at block 458. The processing unit can then calculate a point where the projected light path intersects the inner surface of the rigid inner layer at block 460. The processing unit can store or have access to the refractive indices of the various media in the system. The processing unit can also store or have access to other parameters of the system, including but not limited to the dimension of the training model, thicknesses of the layers of the training model, location and orientation of the cameras. At block 462, the processing unit can calculate a refraction angle, which is the same as the angle of incidence θ1 as shown in FIG. 4A, using the values of the respective refractive indices. At block 464, the processing unit can adjust the projected light by the refraction angle θ1. For example, the processing unit can use the following equation for the adjustment:

$$\frac{\sin\theta_A}{\sin\theta_B} = \frac{n_A}{n_B},$$

where A and B represent two different media and n is the refractive index. At block 466, the processing unit can calculate where the adjusted light path intersects the outer surface of the rigid inner layer. At block 468, the processing unit can calculate a refraction angle, which is the same as the angle of incidence θ2 as shown in FIG. 4A, using the values of the respective refractive indices. At block 470, the processing unit can further adjust the light path by the refraction angle θ2. At block 472, the processing unit can calculate where the adjusted light path intersects an outer surface of the outer layer(s). In some embodiments, the processing unit can take into account the thicknesses of both the elastomeric layer(s) and the opaque outer skin layer. In some embodiments, the processing unit can treat the thickness of the opaque skin layer as negligible compared to the thicknesses of the elastomeric layer(s) and rigid inner layer. In block 474, the processing unit can record a line segment by joining the point of where the adjusted light path intersects the outer surface of the inner layer and the point where the adjusted light path intersects the outer surface of the outer layer(s). In FIG. 4A, this line segment is illustrated as the line segment L between the point 442 and the point 444. The process 450 can then proceed to end block 476.

Turning to FIG. 5, the line segments obtained based on the light detected in each camera can be used to approximate the 3D location of the tip of the injection tool. This is because the angle of incidence of the light, and therefore the angle of refraction, differ when viewed from different cameras at different locations. As a result, two different line segments can be obtained. The process 500 of FIG. 5 starts at block 502. At decision block 504, the processing unit can determine whether light emitted from the tip of the testing tool is within the field of view of both the first camera and the second camera. If light is not within the field of view of both the first and second cameras, the tip of the testing tool may not be within the elastomeric layer(s), and the process can proceed to the end at block 516. If the emitted light is within the fields of view of both the first and second cameras, the processing unit can proceed to block 506 to calculate a first line segment L1 from the outer surface of the inner layer to the outer surface of the outer layer based on the light detected by the first camera. The processor can proceed to block 508 to calculate a second line segment L2 from the outer surface of the inner layer to the outer surface of the outer layer based on the light detected by the second camera. The processing unit can then proceed to block 510 to calculate a point P1 that is nearest to the line segment L2. The processing unit can proceed to block 512 to calculate a point P2 that is nearest to the line segment L1. At block 514, the processing unit can determine an x-y-z position of the light source, which can be indicative of the 3D location of the tip of the injection tool, by calculating a mid-point between the points P1 and P2. The process 500 can then proceed to end block 516.

The process 500 can be repeated by restarting at block 502 to track multiple locations of the tip of the testing tool over time. This data can be used to animate the trajectory of the injection on the output device. In some embodiments, the animation can be in real-time (which includes at least processing time). The 3D location determination processes described above can advantageously provide accurate 3D location of the tip of the injection tool, thereby providing more helpful feedback in injection training, by taking into account refraction of light as the light enters and leaves the rigid inner layer. In some embodiments, the processes can further incorporate different light diffusing and/or transmission properties of different elastomeric layers in order to determine the particular elastomeric layer that the tip of the injection tool has reached. In some embodiments, different elastomeric layers can have fibers arranged in different orientations so that the fibers deflect light in different directions. In some embodiments, different layers of elastomeric layers can have varying degrees of optical transmission. For example, one layer of elastomeric layer can be transparent and another layer can be translucent. Information about the layer that the tip of the injection tool has reached can provide checks against the x-y-z position determined using the processes described herein to further improve accuracy of the x-y-z position determination.

Camera Parameter Variations

Another advantage of the 3D location determination system described above will now be described with reference to FIG. 6. Cameras have intrinsic and extrinsic parameters due to manufacturing variance. Intrinsic parameters can include linear and nonlinear intrinsic parameters, such as focal length, image sensor format, principal point, lens distortion, and the like. Extrinsic parameters can include position and/or rotation of the camera, and coordinate system transformations from coordinates of a chosen coordinate system to 3D camera coordinates. The intrinsic and/or extrinsic parameters of the cameras in the training system can be refined using empirical data of centroid pixel values and their corresponding 3D location values. For a particular camera or lens type, the adjustment only needs to be performed once. The intrinsic parameters of that particular camera or lens type stay the same after the adjustment. The extrinsic parameters also stay the same as long as the cameras are mounted in the same configuration. This adjustment is more advantageous than having to manually calibrate the cameras out of the head.

Figure 6:
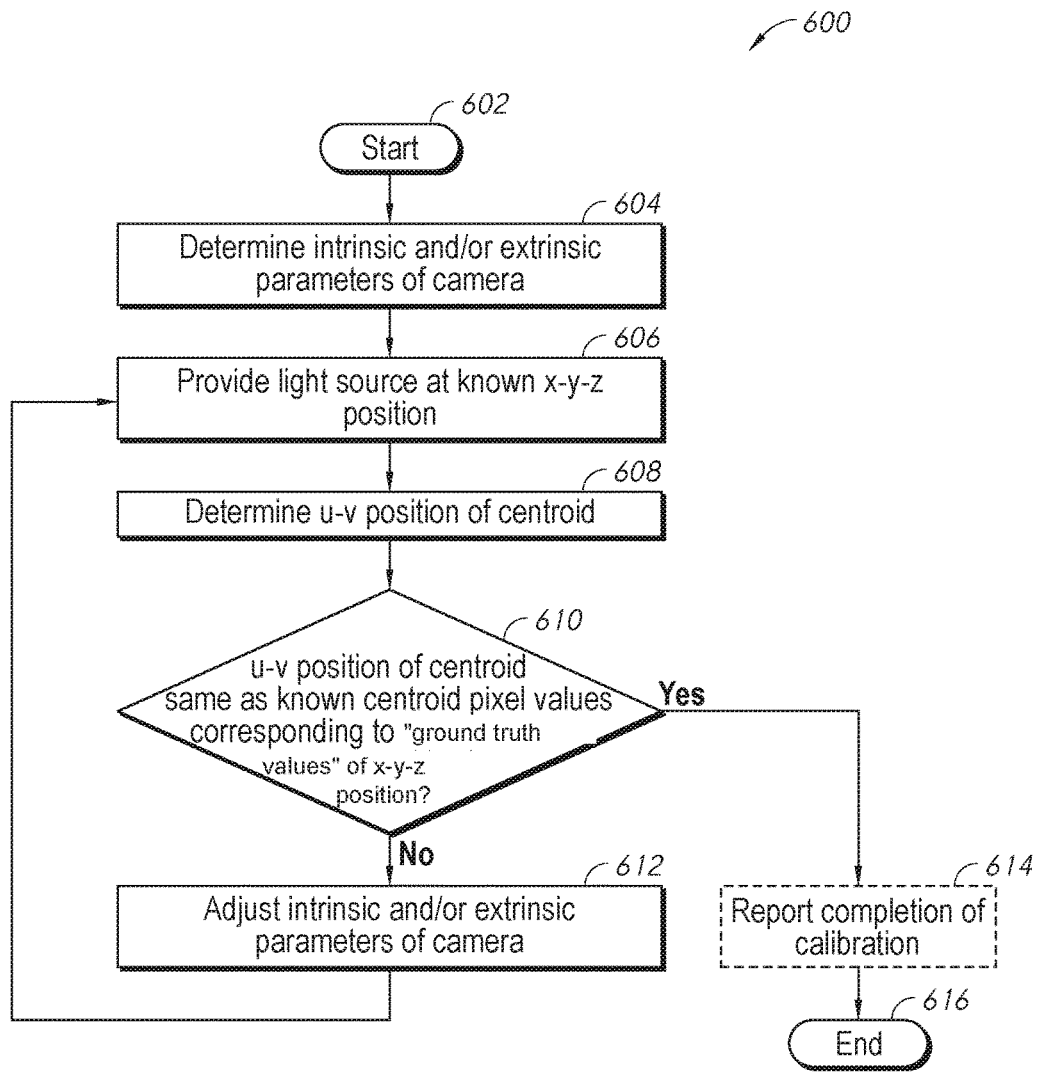
FIG. 6 is an example process that can be implemented to adjust camera parameters of an embodiment of a training system.

As illustrated in FIG. 6, an adjustment process 600 can start at block 602. The processing unit can proceed to block 604 to determine the intrinsic and/or extrinsic parameters of the camera. The processing unit can instruct the system to provide a light source at a known x-y-z position at block 606. The processing unit can then determine the u-v position of the light captured in the field of view of the camera at block 608. At decision block 610, the processing unit can determine if the u-v position of the centroid in the camera is the same as the known centroid pixel values corresponding to "ground truth values" or reference values of the x-y-z position. In some embodiments, the "ground truth values" of the x-y-z position and the corresponding values of the u-v position can be accumulated using the processes described herein. In some embodiments, the "ground truth values" or reference values of the x-y-z position and the corresponding values of the u-v position can be determined by other processes that can be implemented by a skilled artisan based on the disclosure herein. If the determined u-v position is different from the known centroid pixel value, or falls outside a certain acceptable range of pixel values, the processing unit can adjust the intrinsic and/or extrinsic parameters of the camera at block 612 using a variety of algorithms that can be implemented by a skilled artisan based on the disclosure herein. The blocks 606, 608, 610,

612 can be repeated until the determined u-v position is same as the known centroid pixel value, or falls within a certain acceptable range of pixel values. The processing unit can optionally report completion of calibration at block 614 and then proceed to end block 616.

Centroid Determination in Noisy Situations

Figure 7:
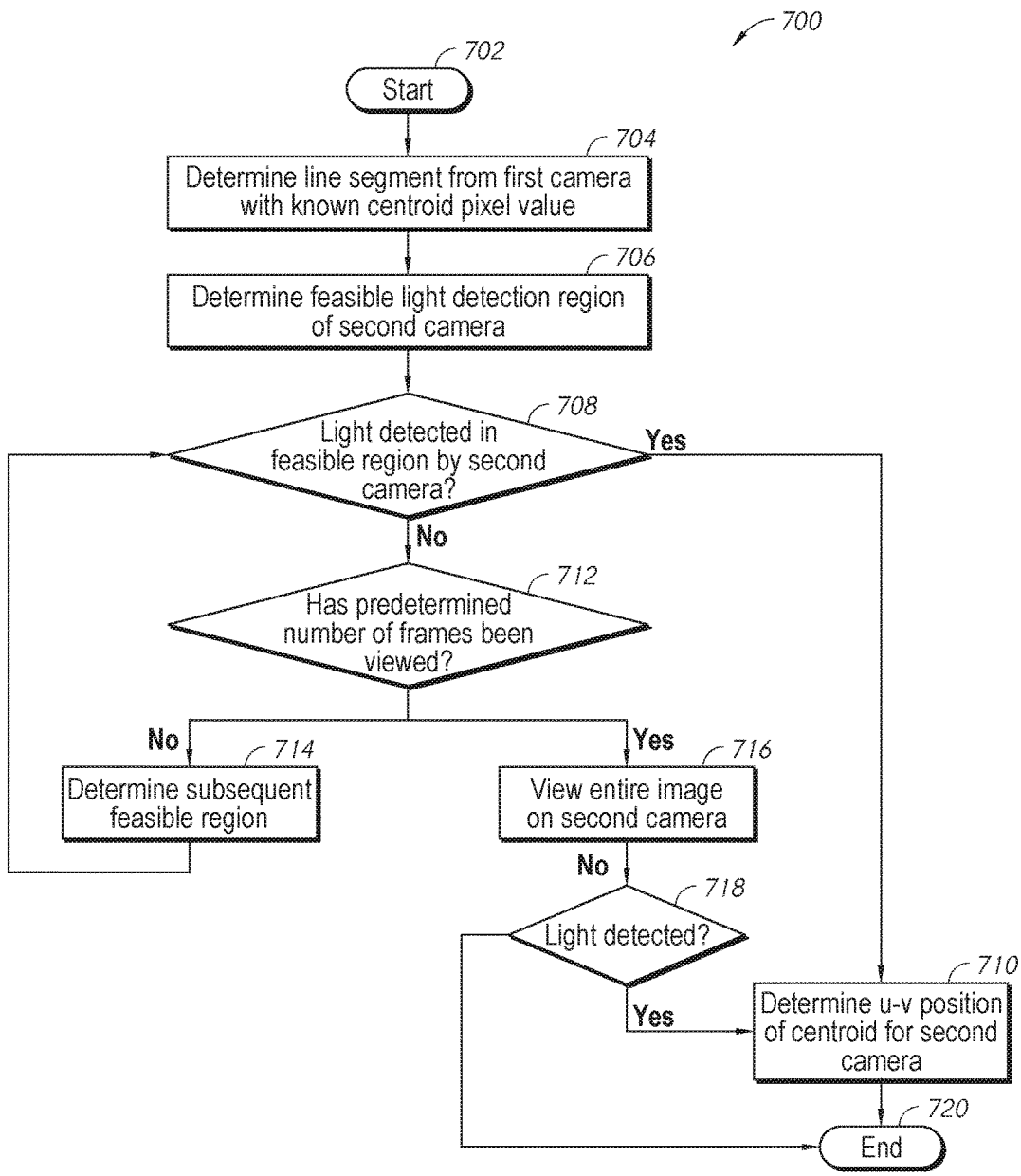
FIG. 7 is an example process that can be implemented to calculate the centroid pixel on a camera of an embodiment of a training system.

In some embodiments, even though the testing or injection tool is inserted in a single position, the emitted light may appear in more than one location because the rigid inner layer and/or elastomeric layer(s) can reflect the light, resulting in a plurality of distinct light spots that can be within in the field of view of a camera. An advantage of a two-camera training system described herein is that a known centroid pixel value from one camera can help determining the centroid value of the second camera in such "noisy" situations due to the reflection of light. FIG. 7 illustrates a process 700 for finding the centroid pixel value in noisy situations. The process 700 starts at block 702. The processing unit can then determine a line segment from the first camera with the known centroid pixel value at block 704. At block 706, the processing unit can use the line segment to determine a feasible light detection region on the second camera. The feasible light detection region can be smaller than the viewing field of the second camera. In some embodiments, the feasible detection region can be determined by estimating where the two end points of the line segment will show up in the viewing field of the second camera. At decision block 708, the processing unit can determine if light is detected in the feasible region by the second camera. If light is detected, the processing unit can proceed to block 710 to determine a u-v position of the centroid on the second camera and then proceed to end block 720. If light is not detected, the processing unit can determine if a predetermined number of frames have been viewed at decision block 712. In some embodiments, the predetermined number of frames can be between 1-5 frames. If the number of frames viewed has not reached the predetermined number, the processing unit can proceed to block 714 to determine a subsequent feasible light detection region. In some embodiment, the subsequent feasible region can be determined based on the length of the injection tool, which can define the maximum travel distance of the light from where the light was previous seen. If a predetermined number of frames have been viewed, the processing unit can proceed to block 716 to look at the entire viewing field of the second camera, and determine at decision block 718 if light is detected. If light is detected, the processor can proceed to block 710 to determine a u-v position of the centroid on the second camera and then proceed to end block 720. If light is not detected in the entire viewing field, the process 500 can proceed to end block 516.

Other Variations

In some embodiments, if the emitted light is within the field of view of both cameras, the processing unit can determine the location of the centroid of the area of emitted light (e.g., the u-v position of the centroid) from the field of view of each camera. The processing unit can then determine the x-y-z position by comparing data representative of the location of the centroid from both cameras with calibration data. This step can be executed using linear matrix multiplication as follows: x, y, z=X*[$u_1$, $v_1$, $v_2$].

Figure 8:
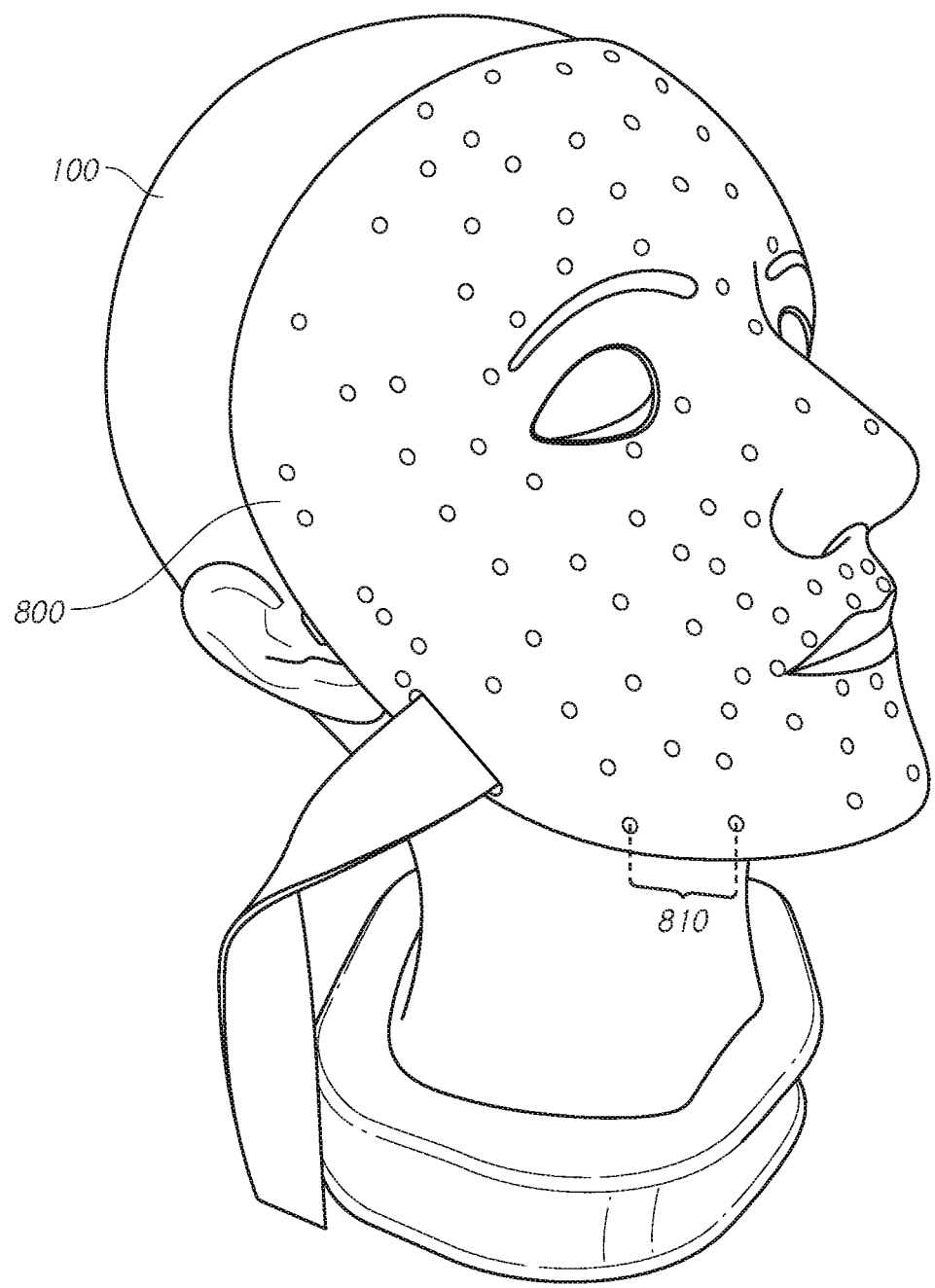
FIG. 8 illustrates an example calibration jig for the training model.

The X matrix includes calibration data that can be determined empirically using a calibration jig 300 shown in FIG. 8. As shown in FIG. 8, the calibration jig 800 can be positioned over the training model 100. For example, the training model 100 can be a mask. The calibration jig 800 can include a plurality of guide holes 810 indicative of potential injection sites. The testing tool can be inserted into each of the guide holes 810 and the centroid of the area of emitted light (for example, the u-v position of the centroid) for each guide hole 810 and for each camera can be recorded. In some implementations, the u-v position of the centroid is recorded at the surface of the training model 100 at each guide hole 810. Because the guide holes 810 are located over sections of the training model 100 at different distances from the cameras, depth information can be determined empirically. In some implementations, calibration data (e.g., the u-v position of the centroid) for at least two depths, for example at the surface of the training model 100 and within the training model 100 (for example, 3 mm deep), can be recorded for each guide hole 810.

Although the disclosure describes determining a 3D position based on a location of emitted light, the other properties of the light may also be taken into consideration such as intensity, angle, dispersion, brightness, color, and/or duration of the light.

Terminology

As used herein, the relative terms "superior," "inferior," and "anterior" have their usual and customary anatomical meaning. For example, superior refers to the direction of the top of a head and inferior refers to the direction of the neck.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The term "about" as used herein represents an amount close to the stated amount that still performs a desired function or achieves a desired result. For example, the term "about" may refer to an amount that is within less than 10% of the stated amount or as the context may dictate.

Any methods disclosed herein need not be performed in the order recited. The methods disclosed herein include certain actions taken by a practitioner; however, they can also include any third-party instruction of those actions, either expressly or by implication. For example, actions such as "inserting the testing tool" include "instructing insertion of a testing tool."

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on general purpose computer hardware, or combinations of both. Various illustrative components, blocks, and steps have been described above generally in terms of their functionality. Whether such functionality is implemented as specialized hardware versus software running on general-purpose hardware depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. An injection training system, the system comprising:
    an anatomic training model, the training model including one or more resilient layers configured to receive a tip of a testing tool and a rigid innermost layer, the one or more resilient layers and rigid innermost layer being optically transmissive, the innermost layer defining a cavity within the training model;
    a first camera mounted within the cavity, the first camera having a first central viewing axis;
    a second camera mounted within the cavity, the second camera having a second central viewing axis extending at an angle offset from the first central viewing axis, the first and second cameras each having fields of view configured to detect light emitting from the tip of the testing tool, wherein the first camera is positioned in a superior portion of the anatomic training model and the second camera is positioned in an inferior portion of the anatomic training model so as to increase an overlapping field of view covering at least partially an anterior portion of the anatomic training model; and
    a processing unit configured to determine a three-dimensional position of the tip of the testing tool based on locations of the centroids of emitted light detected in the fields of view of the first and second cameras and refraction of the emitted light through the innermost layer.

2. The system of claim 1, further comprising a support structure configured for mounting the first and second cameras.

3. The system of claim 1, wherein the testing tool comprises a syringe, a biopsy needle, a catheter, or another type of injection device.

4. The system of claim 1, further comprising an output device in communication with the processing unit and/or the first and second cameras and configured to generate information regarding injection parameters based on the communications.

5. The system of claim 1, wherein the first central viewing axis is at a ninety degree angle with respect to the second central viewing axis.

6. The system of claim 1, wherein the one or more resilient layers comprise at least one elastomeric layer.

7. The system of claim 1, wherein the training model further comprises an opaque outer skin layer.

8. The system of claim 1, wherein the training tool comprises an optical fiber configured to emit light from the tip of the training tool.

9. An injection training system, the system comprising:
an anatomic training model, the training model configured to receive a tip of a testing tool, the training model comprising an inner cavity;
a first camera mounted within the cavity, the first camera having a first central viewing axis, wherein the first camera has a first plurality of intrinsic and/or extrinsic parameters; and
a processing unit configured to determine a location of a centroid of emitted light detected in the field of view of the first camera, the light being emitted from the tip of the testing tool at a known three-dimensional position, wherein the processing unit is further configured to adjust the first plurality of intrinsic and/or extrinsic parameters based on one or more reference three-dimensional positions and corresponding locations of the centroid of emitted light.

10. The system of claim 9, further comprising a second camera mounted within the cavity, the second camera having a second central viewing axis extending at an angle offset from the first central viewing axis, the camera having a second plurality of intrinsic and/or extrinsic parameters.

11. The system of claim 10, wherein the processing unit is configured to adjust the second plurality of intrinsic and/or extrinsic parameters based on the one or more reference three-dimensional positions and corresponding locations of the centroid of emitted light.

12. The system of claim 9, wherein the intrinsic parameters comprise one or more of focal length, image sensor format, principal point, and/or lens distortion.

13. The system of claim 9, wherein the extrinsic parameters comprise one or more of position of a camera, rotation of a camera, and/or coordinate system transformations from coordinates of a chosen coordinate system to 3D camera coordinates.

14. An injection training system, the system comprising:
a first camera mounted within an anatomic training model, the anatomic training model configured to receive a tip of a testing tool, the first camera having a first central viewing axis;
a second camera mounted within the anatomic training model, the second camera having a second central viewing axis extending at an angle offset from the first central viewing axis, wherein the first camera is positioned in a superior portion of the anatomic training model and the second camera is positioned in an inferior portion of the anatomic training model, the first and second cameras positioned at a distance from each other, the first central viewing axis extending anteriorly and inferiorly and the second central viewing axis extending anteriorly and superiorly, the first and second cameras each having fields of view configured to detect light emitting from the tip of the testing tool such that relative positions and orientations of the first and second cameras are configured to increase an overlapped region of the field views of the first and second camera; and
a processing unit configured to determine a three-dimensional position of the tip of the testing tool based at least on locations of the centroids of emitted light detected in the fields of view of the first and second cameras.

15. The system of claim 14, wherein the first central viewing axis is at between about 1 to about 90 degree angle with respect to the second central viewing axis.

16. The system of claim 14, wherein the processing unit is further configured to determine the three-dimensional position of the tip of the testing tool based refraction of the emitted light through the training model.

* * * * *